United States Patent [19]

Beckwith et al.

[11] Patent Number: 4,702,698
[45] Date of Patent: Oct. 27, 1987

[54] DIGITAL RADAR GENERATOR

[75] Inventors: Paul B. Beckwith, Indialantic; Donald S. Bistarkey, Palm Bay; Joseph J. Pohedra, Melbourne Beach; Donald E. Trimble, Melbourne, all of Fla.

[73] Assignee: Harris Corporation, Melbourne, Fla.

[21] Appl. No.: 652,875

[22] Filed: Sep. 21, 1984

[51] Int. Cl.$^4$ .............................................. G09B 9/00
[52] U.S. Cl. .................................................... 434/2
[58] Field of Search ............. 343/5 MM, 17.7, 5 SC; 434/2; 342/64, 65; 364/449

[56] References Cited

U.S. PATENT DOCUMENTS

| | | | |
|---|---|---|---|
| 4,002,827 | 1/1977 | Nevin et al. | 342/185 |
| 4,085,524 | 4/1978 | Meyer | 434/2 |
| 4,224,669 | 9/1980 | Brame | 342/65 X |
| 4,347,511 | 8/1982 | Hofmann et al. | 342/64 X |
| 4,360,876 | 11/1982 | Girault et al. | 364/449 |
| 4,412,220 | 10/1983 | Aanstoot et al. | 343/5 SC |

Primary Examiner—T. H. Tubbesing
Assistant Examiner—Mark Hellner
Attorney, Agent, or Firm—Antonelli, Terry & Wands

[57] ABSTRACT

A radar return image for display on a cockpit CRT is generated by selectively accessing terrain data compressed and stored in a digital map data base and processing that data to artificially simulate a radar return image pattern on a cockpit display which effectively corresponds that which would otherwise be provided by conventional T/R equipment. Since the compressed data base contains information representative of both the elevation and cultural features of the terrain at map locations that are capable of being intercepted by the aircraft's radar beam, this data may be subjected to signal processing functions to establish pixel intensity control signals by way of which a radar image of a cockpit CRT display is generated. This signal processing and control system includes system functional components for establishing the simulation of the effect of a radar beam having a prescribed beam width, slant-angle, and field of scan and controllably accessing the stored terrain map data from memory for establishing a pixel display data base in accordance with which the pixels of the cockpit radar display are intensity-modulated.

46 Claims, 33 Drawing Figures

480 GRID PTS. OF STORED ELEV. + CULT. DATA

DIGITAL RADAR GENERATOR

FIELD OF THE INVENTION

The present invention relates in general to information display systems and, more particularly, to a system for processing digital map data representative of the terrain over which a vehicle such as an aircraft is passing, or simulation thereof, and the generation therefrom of a simulated radar return display to the pilot (observer).

BACKGROUND OF THE INVENTION

In copending patent application Ser. No. 641,179, filed Aug. 15, 1986, which is a continuation of application Ser. No. 224,742, filed Jan. 13, 1981, now abandoned, by Paul B. Beckwith Jr. entitled "Digital Map Generator and Display System", assigned to the Assignee of the present application, there is described a system for effecting the dynamic display of terrain data, which is compressed and stored in digital form and which may be selectively and controllably accessed from memory and viewed on a cockpit cathode ray tube display in the form of a moving map of the terrain over which the aircraft is flying, offering the pilot an advanced navigational tool not previously provided by conventional terrain mapping schemes. In accordance with this improved system, both elevation and cultural information may be displayed to assist the pilot in navigating and controlling the aircraft.

Advantageously, this information may be displayed to the pilot not only in the form of a moving map, as is carried out in the system described in the above-referenced '742 application but, through the use of prescribed signal processing and display control circuitry, the stored terrain data may be used to present to the pilot/observer a perspective view of the terrain beneath and ahead of the aircraft's flight path. Two systems for accomplishing this task are described in copending patent application Ser. No. 517,037 filed July 25, 1983 by Paul B. Beckwith Jr. et al, entitled "Real Time Perspective Display Employing Digital Map Generator" and copending patent application Ser. No. 308,166 filed Oct. 2, 1981, by Paul B. Beckwith Jr. et al entitled "Real Time Video Perspective Digital Map Display", now U.S. Pat. No. 4,489,389, issued Dec. 18, 1984, respectively, each application being assigned to the Assignee of the present application.

Now, while the above-mentioned terrain display (moving map and perspective) systems are significantly advanced expedients for assisting the pilot in the navigation and control of the flight of the aircraft, they are not all inclusive of the types of guidance information display systems with which the cockpit may be fitted. One commonly employed navigation display device is the radar display, through which the pilot is provided range and bearing information of aspects of the terrain lying beneath and ahead of the aircraft based upon radar return signals processed by on board radar equipment, such as microwave transmission and reception devices and FLIR (forward looking infrared radar) systems. In accordance with the operation of such equipment, as a transmit/return beam, having prescribed beam pattern and energy characteristics, is scanned ahead of and beneath the aircraft, a corresponding monochromatic sweep over a prescribed field of view is scanned on the face of a cockpit CRT and reflectance returns are imaged on the pilot's screen as the sweep translates their location (bearing) relative to the aircraft.

SUMMARY OF THE INVENTION

In accordance with the present invention, in place of conventional transmit/receive equipment and associated signal processing components for generating a radar return image for display on a cockpit CRT, advantage is taken of terrain data that may be stored in and accessed from memory, such as the compressed data base employed in the system described in the above-referenced '742 application, to artificially generate a radar return image pattern on a cockpit display which effectively simulates that which would otherwise be provided by conventional T/R equipment. Since the compressed data base contains information representative of both elevation and cultural features of the points on terrain that are capable of being intercepted by the aircraft's radar beam, this data may be subjected to the novel and improved signal processing functions carried out by the system of the present invention to establish pixel intensity control signals by way of which a radar image of a cockpit CRT display is generated. This signal processing and control system includes system functional components for establishing the simulation of the effect of a radar beam having a prescribed beam width, slant-angle, and field of scan and controllably accessing the stored terrain map data from memory for establishing a pixel display data base in accordance with which the pixels of the cockpit radar display are intensity-modulated.

Briefly, the configuration of the digital radar generator in accordance with the present invention is comprised of a radar return signal processing section and a display control processing section. The radar return signal processing section is coupled with the terrain map data base and, based upon navigational inputs defining the location and heading of the aircraft in relation to the terrain data of the data base, together with radar sweep pattern characteristics to be simulated, generates radar return signals that would be effectively produced by the radar system being simulated for a defined set of terrain map locations lying within the field of sweep of the radar beam. This set of terrain map locations is assembled in terms of successive data points along respective lines (rays) originating at the aircraft's location and extending radially outward therefrom at the look and slant angles of the simulated radar beam pattern.

Radar return values for each of these data points provide two items of information: one—the distance (range) from the radar beam source at the aircraft to the point in the terrain intercepted by the radar beam; and two—the magnitude of the reflectance return from whatever is located at that terrain location (e.g. a water tower would provide a larger, more discernable magnitude reflectance value than would desert sand). Range information is calculated in accordance with a trigonometric algorithm which uses aircraft altimeter data and terrain elevation data at the data point of interest. Reflectance return information is calculated in accordance with cultural characteristics of the terrain at the terrain map data point of interest which include information relating to the geographical characteristics of the terrain (e.g. rocks, trees, water, their type (e.g. spruce vs. oak trees) and height, etc.) the aspect angle of the terrain relative to the incidence of the beam at that point, curvature of the earth, as well as characteristics of the radar beam itself, e.g. vertical beam width or depth energy distribution profile, and parameteric data associated with the type of equipment whose radar beam stream pattern is being simulated.

Each of these two information values (i.e. range and reflectance magnitude), for the respective data points of interest lying along the radial lines of the radar sweep pattern's field of scan, is coupled to the display processing section of the system. Within the display processing section, as return values are generated by the radar return signal processing section, the reflectance magnitude values are stored in successive storage locations of a data buffer addressed in accordance with the range value data. For a prescribed group of such stored values representing the reflectance returns for adjacent radial lines of the radar beam pattern, a beam weighting algorithm is employed to convert received reflectance values into reflectance values associated with the centerline of the beam (which has a defineable width in the horizontal or scan direction on the terrain map), as the simulated beam is swept back and forth over the field of scan of the radar sweep pattern. These converted reflectance values are then compressed by a radar pulse representative processing function to produce a plurality of pixel intensity control values through which the pixels of the cockpit CRT display are to be illuminated.

To ensure that the displayed sweep achieves the full resolution capability of the display, additional interpolated pixel values are generated based upon the reflectance magnitude values stored in the beam buffers, and resulting pixel values are written into a display memory in accordance with address values associated with the successive pixel values for a series of radial beam lines extending from a beam source reference point (the aircraft's location on the display) over the extent of the radar sweep pattern image to be generated on the display (e.g. the face of the cockpit CRT). In other words, pixel value data is written into the display memory in correspondence with the sweep of the radial lines of the radar pattern. On read out however, the pixel values are accessed in accordance with the X-Y raster scan of the CRT. To prevent a conflict between these different coordinate system scans (polar vs. rectangular) of the display memory, the display memory is accessed in dependence upon which field (odd or even) is being read out by the rectangular raster scan of the CRT. The signal processing rate for the reflectance data values, as they are stored in the beam buffers, processed and written into the display memory, is fast enough to permit the stored data values to be processed twice (once for the odd field, once again for the even field) for every frame of data to be accessed from the display memory and displayed on the radar screen. Thus, during read out of an even field of pixel data from the display memory only those pixel values (along the radial beam lines of the sweep pattern that are being coupled to the display memory) that are associated with the odd field of pixels of the display are written into the display memory. The converse occurs for read out of the odd field of pixel values from the display memory. However, because of the signal processing rate there is no loss of data and the CRT scan tracks the radar sweep pattern scan over the terrain map data base.

DETAILED DESCRIPTION

Before describing, in detail, the particular simulated radar generation scheme in accordance with the present invention, it should be observed that the invention resides primarily in a novel combination of conventional data storage, signal processing and display components. Accordingly, the structure, control and arrangement of such components have been illustrated in the schematic diagrams of the drawings by readily understandable block representations which show only those specific details that are pertinent to the present invention, so as not obscure the disclosure with structural details which will be readily apparent to those skilled in the art having the benefit of the description herein. Thus, the block diagram illustrations do not necessarily represent the mechanical structure arrangement of an exemplary digital radar generator, but are primarily intended to depict the major equipment components of such a digital radar simulation scheme in a convenient functional grouping, whereby the present invention may be more readily understood.

Figure 1:
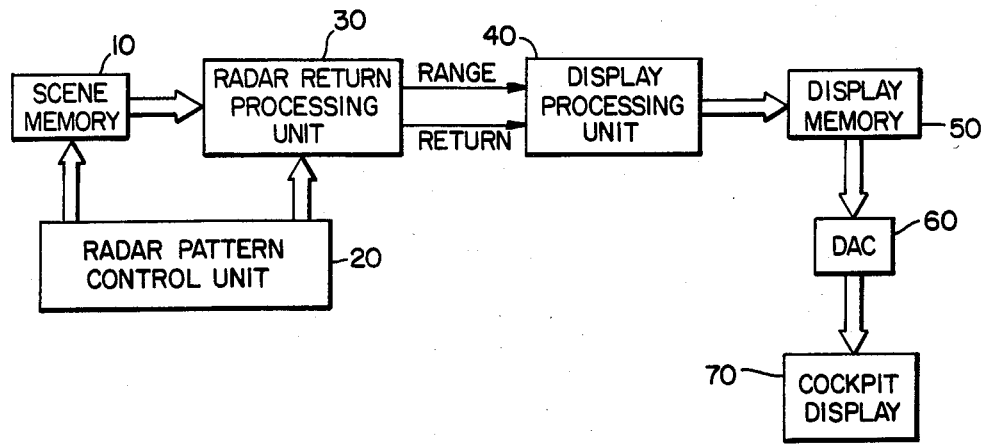
FIG. 1 is a schematic block diagram of a digital radar generator in accordance with the present invention.

Referring now to FIG. 1, a schematic block diagram of a digital radar generator in accordance with the present invention is shown as including a pair of storage units, respectively identified as a scene memory 10 and a display memory 50, a radar pattern control unit 20 for accessing the contents of the scene memory 10 and applying control information to a radar processing unit 30 which receives data output from the scene memory 10 and processes that data to generate radar reflectance return-representative signals. These signals are supplied to a display processing unit 40 which processes the radar reflectance return-representative signals and generates therefrom pixel intensity representative signals which are controllably buffered in display memory 50. On read out, the pixel intensity representative signals are converted into analog form by digital-to-analog converter (DAC) 60 and applied to a cockpit display (CRT) 70 for presentation of a simulated radar return display to the pilot/observer.

The details of the above components of which the present invention is configured, shown in FIG. 1, will be explained with reference to subsequent figures in the drawings in the amplified description to follow. To better appreciate the manner in which the present invention generates a simulated radar pattern from a stored data base, it is useful to consider the make-up of that data base and its relationship to a swept radar beam that would normally be transmitted from and reflected back to radar equipment located in an aircraft (actually or simulated to be) flying over the terrain, elevation and cultural characteristics of which are stored in the terrain map data base.

Figure 2:
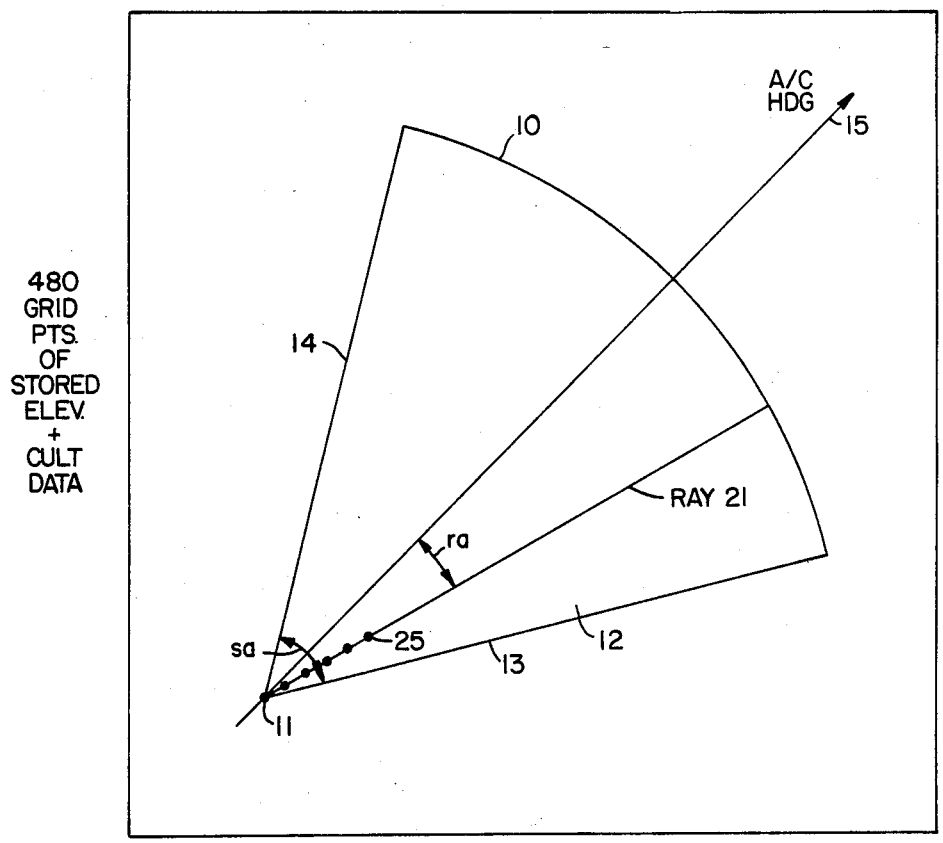
FIG. 2 shows the superimposition of a radar sweep pattern on a matrix of terrain map grid points.

Referring now to FIG. 2, there is shown a radar sweep pattern 12 superimposed upon a matrix of terrain map grid points covering a prescribed geographical area and stored in a scene memory 10. As mentioned previously, scene memory 10 may be configured in the manner described in the above-referenced copending '742 application, and is dynamically updated in accordance with navigational inputs from the aircraft's avionics. In the illustration shown in FIG. 2, scene memory 10 is represented as a symmetrical matrix of a multiplicity of geographical grid points, each grid point corresponding to a prescribed location on a terrain map and having associated therewith both elevational and cultural data. It should be observed that the number of grid points and resolution of (geographical spacing between) the grid points is not limited to that discussed here or explained in the above-mentioned applications. The parametric values given are simply for purposes of providing an exemplary illustration. For purposes of the present discussion, it will be assumed that scene memory 10 covers a prescribed geographical area of terrain over which the aircraft is or simulated to be flying and is made-up of a matrix of 500 × 1000 grid points, and for which a north-up or Y direction and an east-right or X direction establish respective orthogonal coordinate axes of the matrix.

For each of the grid points, there is a corresponding memory address having a prescribed storage capacity for storing selected elevational and cultural features. Again, reference may be had to the foregoing '742 application for more detailed description of the make-up of the scene memory and the compression and storage of both elevational and cultural data.

In the illustration shown in FIG. 2, radar sweep pattern 12 is shown as emanating from the location of the aircraft or observer at point 11 and fanning out ahead of the aircraft, which has a heading along a directional line 15. In the illustration shown in FIG. 2, the sweep angle sa of the radar sweep pattern 12 is 60°. The invention is not limited to this angle of sweep or another sweep angle, but may be any sweep angle which is adapted to the practical limits of the display and area of the terrain stored in memory. As will be described below, a selection of one of sweep angles of 60°, 90° or 120° provides a respective sweep pattern consistent with present day radar display systems. It should also be observed that the terrain map data stored in the scene memory 10 need not be a symmetrical pattern, as shown in the example of FIG. 2. As described in the foregoing '742 application, the terrain data stored in the scene memory 10 is subdivided into blocks of a prescribed number of grid points each. Thus, the blocks may be rearranged and selectively updated based upon aircraft heading and areal coverage of the beam pattern 12 to insure that the beam pattern 12 is always superimposed on terrain map data and does not extend beyond the edges of the map.

Looking now at the make-up of the radar sweep pattern 12, per se, as shown in FIG. 2, the pattern is bounded by a clockwise-most linear edge or radar sweep boundary 13 and a counterclockwise-most linear edge or radar sweep boundary 14. The sweep extends over an arc 16 from the location 11 of the aircraft and in the direction of the aircraft heading 15. As shown in FIG. 2, the look angle, namely the center line of the sweep angle relative to the aircraft heading, is coincident with the aircraft heading. It may be offset therefrom, if desired, in the same manner that conventional T/R radar equipment may be offset relative to the heading of the aircraft. The manner in which this accomplished through the signal processing scheme of the present invention will be described below. For purposes of an understanding of the illustration in FIG. 2, however, the look angle is considered to be coincident with the heading of the aircraft 15.

Within the pattern 12, there may be considered to be a plurality of rays, each of which extends from the location of the aircraft 11 in a radial direction therefrom to a sweep arc line 16. Another way of considering the radar sweep pattern 12 is the sweep of one or more rays from one edge 13/14 to the other edge 14/13 and back again, just as occurs in a mechanical or electronically scanned conventional radar system to produce a corresponding swept pattern on the face of the cockpit CRT. In the diagram of FIG. 2, an individual ray 21 is shown as being offset from the aircraft heading by some ray angle ra, corresponding to the difference between the heading 15 and the direction of the ray 21 itself. Along the ray 21, there are a plurality of points 25, the locations of which are generated by a radar pattern control unit 20, to be discussed below, for accessing both elevational and cultural data at grid points of the stored terrain data map in scene memory 10 most closely associated with the points that are generated along each respective one of the rays of which the radar sweep pattern is comprised. Namely, in accordance with the present invention, a simulated radar pattern is generated on the face of the cockpit display by selectively accessing data values at respective ones of the grid points of the terrain map stored in the scene memory 10, as determined by generated data points along respective rays of which the radar sweep pattern 12 is formed, and in a manner to simulate the sweep movement of a radar beam.

Figure 3:
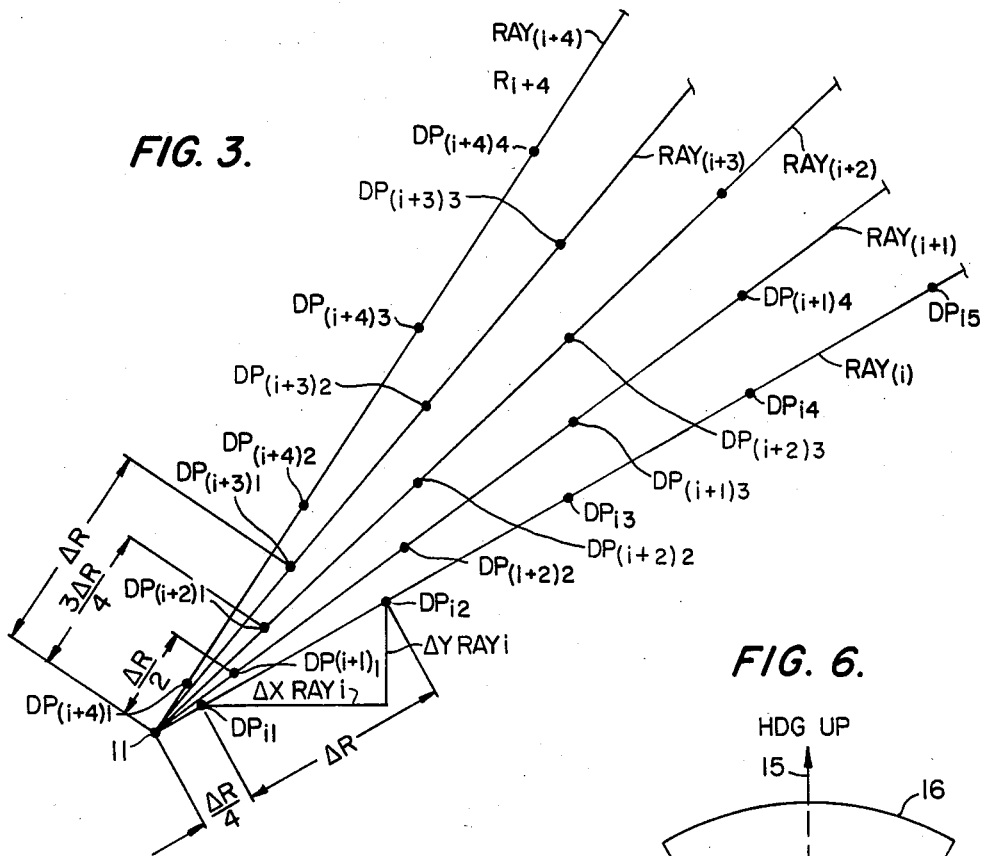
FIG. 3 shows a plurality of adjacent rays of a radar sweep pattern and the relative offset among data points of the respective rays.

For successive rays that are scanned over the radar sweep pattern 12, the data points along each ray are offset from one another in order to ensure that during the scan of the contents of the scene memory 10, each grid point of the terrain map falling within the radar beam pattern's field of sweep will be accessed, thereby achieving the resolution capability of the scene memory. FIG. 3 shows the manner in which these offsets among the data points for a plurality (or set) of adjacent rays are defined. In FIG. 3, there are shown five adjacent rays (ray (i) . . . ray (i+4)). Along ray (i), there are a plurality of data points $DPi_1$, $DPi_2$, . . . Similarly, along each of the other rays shown (ray (i+1) . . . ray (i+4)) there are respective pluralities of data points $(DP(i+1)_1 . . . DP(i+4)_4 . . .)$. Along a respective ray, such as ray (i), the spacing $\Delta R$ between successive points $DPi_1$-$DPi_2$ is the same. However, for a set of adjacent rays (here a set of four rays (i)-(i+3)), the data points are offset (relative to the location of the aircraft or vertex of the radar pattern 11) from one another by a fraction of the spacing $\Delta R$ between adjacent points on the same ray, in order to provide the above-referenced grid point accessing capability. This is illustrated in FIG. 3 by the successive offsets among the data points for the adjacent rays of the set, which offsets are one-fourth of the spacing between points along the same ray. Namely, as shown in FIG. 3, data point $DPi_1$ for ray (i) is offset from the location of the observer or aircraft 11 by one-fourth of the spacing $\Delta R$ between adjacent points (i.e. $\Delta R/4$). For ray (i+1), the spacing between data point $DP(i+1)_1$ and the location of the observer 11 is the distance $2\times \Delta R/4$ (i.e. $\Delta R/2$). For ray (i+2) the offset between data point $DP(i+2)_1$ and the observer point 11 is 3 $\Delta R/4$. For ray (i+3), the offset between data point $DP(i+3)_1$ and the observer 11 is distance $4\times \Delta R/4$, or simply $\Delta R$. For ray (i+4) the offset of data point $DP(i+4)_1$ and the observer 11 is $\Delta R/4$ or the same offset as that of ray (i). In other words, for adjacent rays in the set, the incremental offsets between corresponding data points is equal to the offset between adjacent points on the same ray divided by the number of the rays in the set (here 4). Of course, in the illustration of FIG. 3, the displacement of the rays from one another and the displacement and offset between adjacent points on the rays are not shown to scale, but are shown simply for purposes of illustration and to facilitate an understanding of the distribution of the data points relative to one another.

Figure 4:
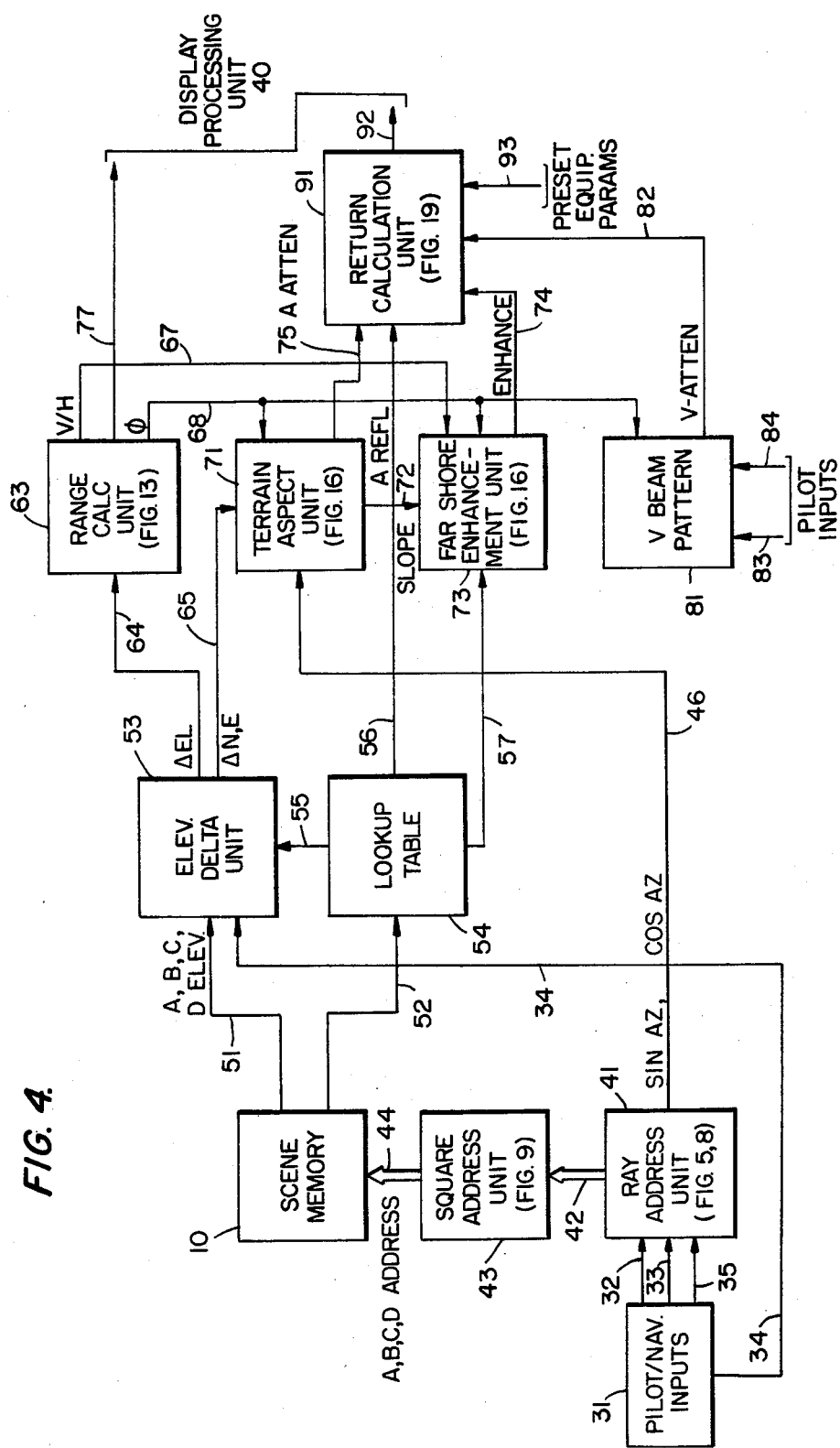
FIG. 4 is a schematic block diagram of the radar return signal processing portion of the digital radar generator shown in FIG. 1.

Referring now to FIG. 4, a block diagram of the components of scene memory 10, radar pattern control unit 20 and radar processing unit 30, which supply radar return-representative digital data to the display processing components of the present invention, are shown. As mentioned previously, scene memory 10 contains both elevational and cultural data for a plurality of geographical grid points of a terrain data map stored in digital-compressed form and is preferably configured as a DRAM (dynamic random access memory). Again, attention may be directed to the above-mentioned '742 application for a detailed description of an embodiment of scene memory 10 and the manner in which the data is stored therein. For purposes of the present description, scene memory 10 is to be accessed by the address signals generated by radar pattern control unit 20, in response to which address signals elevational and cultural data for respective grid points are coupled over links 51 and 52 to radar processing unit 30.

Figure 7:
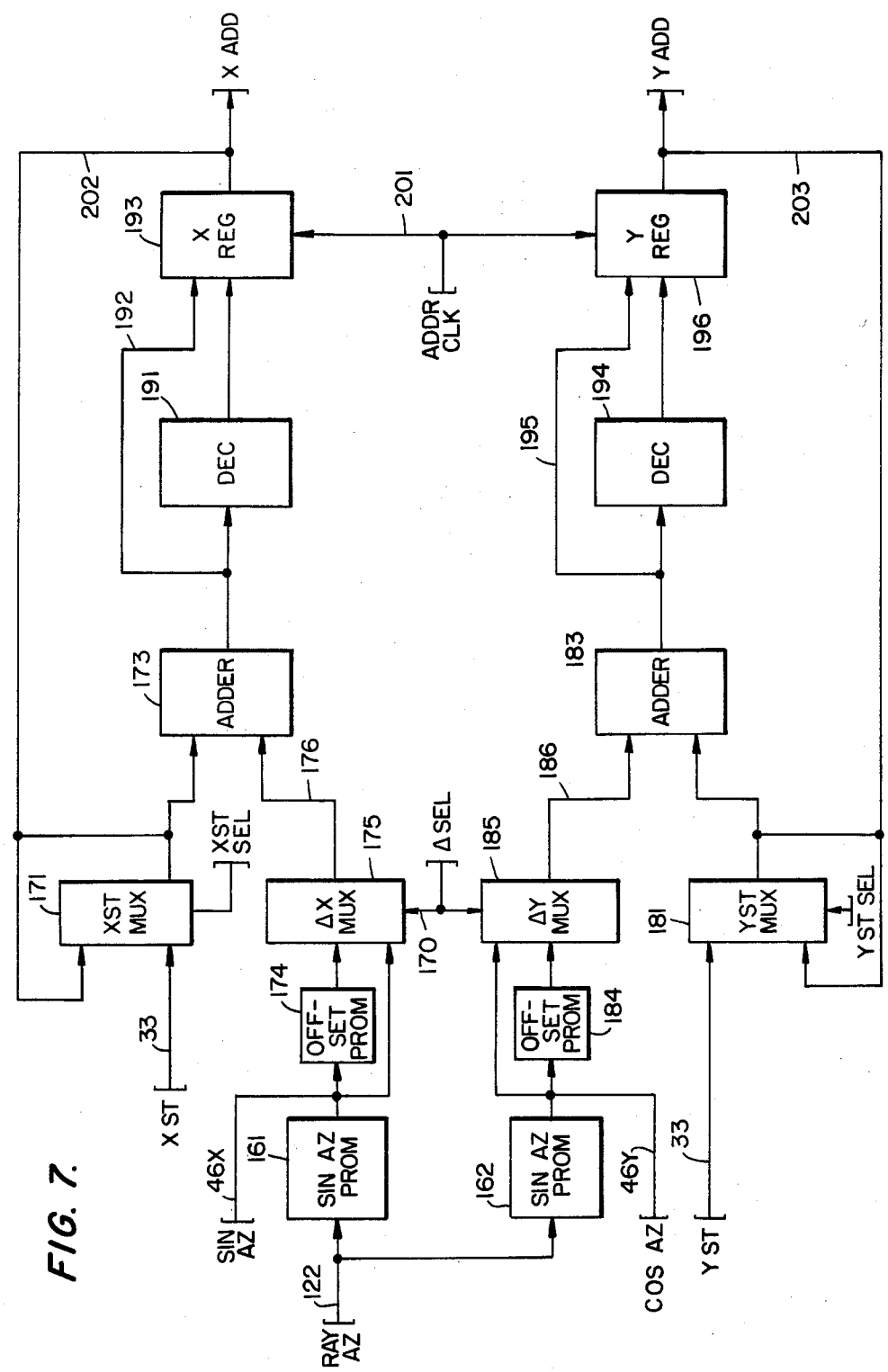

Within the radar pattern control unit 20, inputs from the pilot and navigational equipment in the aircraft, identified as pilot/navigation input unit 31, corresponding to heading, the location of the aircraft (or source point of the radar scan), and the elevation of the aircraft (altitude), are supplied over links 32, 33 and 34, respectively. Link 35 conveys signals corresponding to the type of scan employed, namely the angle of sweep and the rate of sweep, as established on the pilot's cockpit control panel. Links 32 and 33 are coupled to a ray address unit 41 (to be described in detail below in conjunction with the description of FIGS. 5 and 7), from which address signals, for accessing respective data points along the respective rays of which the scan pattern is configured, as shown in FIGS. 2 and 3, are produced. Ray address unit 41 couples X, Y address signals over link 42 to a square address unit 43 (to be described in detail below in connection with the description of FIG. 9). In response to a respective XY address signal pair, corresponding to the terrain map address of a respective data point on an individual ray from ray address unit 41, square address unit 43 outputs a set of four addresses corresponding to four adjacent grid points on the terrain map stored in scene memory 10. These grid points typically encompass an area within which the data point corresponding to the XY address supplied by ray address unit 41 lies. It is from the elevation and cultural data values associated with these respective four grid points, as read out from the scene memory 10, that the radar return information is generated and processed in radar processing unit 30.

Radar processing unit 30 contains a plurality of signal processing circuits for extrapolating radar return information associated with the respective data points on each of the rays of which the radar sweep pattern is comprised and presents such information to display processing unit 40. Because the radar beam that is typically transmitted from the radar equipment in the aircraft is transmitted at a prescribed slant angle to intersect the terrain beneath and ahead of the aircraft, data indicative of the relative difference of the altitude of the aircraft and that of the terrain from which the beam is reflected and returned to the aircraft must be provided. For this purpose, an elevation delta unit 53 (to be described in detail below with reference to FIGS. 11 and 12) receives the elevation data for the four adjacent grid points, coupled over link 51 from scene memory 10, and data on line 34 representative of the altitude of the aircraft, and processes this data, together with cultural data supplied over link 55 from a lookup table 54. The result of this processing is to produce an output over link 64 corresponding to the difference in altitude of the aircraft and the precise height of the terrain at the data point of interest. Also, on link 65, terrain slope information, indicative of the inclination or slope of the terrain, is supplied to a terrain aspect processing unit 71 (described in detail below in conjunction with the description of far-shore enhancement unit 73 shown in FIG. 16).

Figure 14:
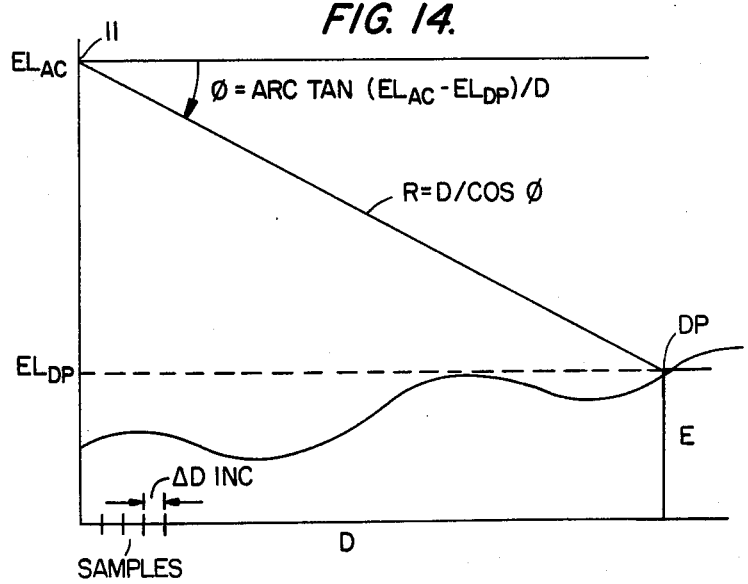
FIG. 14 is a range calculation diagram useful for explaining the operation of range calculation unit 63 of FIG. 14.
Figure 15:
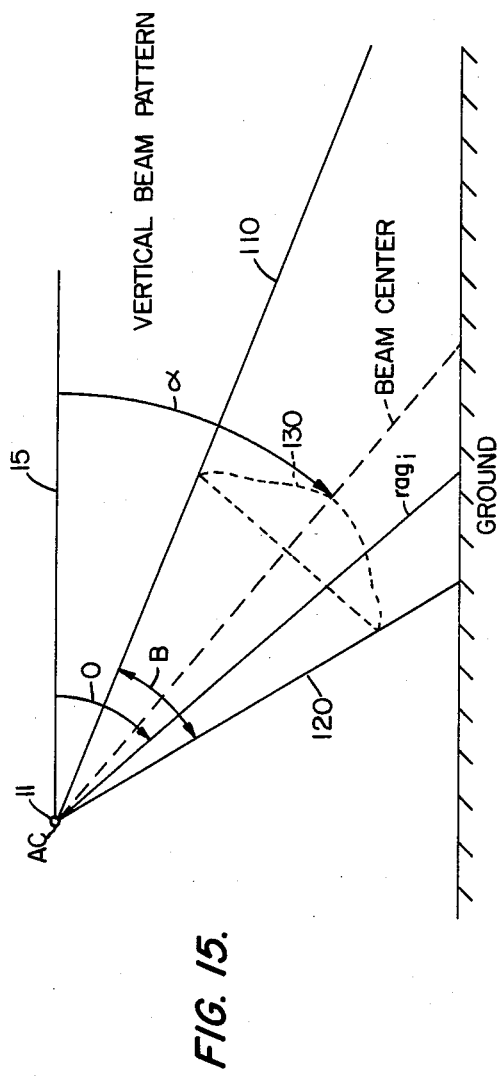
FIG. 15 is a diagram of the vertical profile of a radar beam.

Range calculation unit 63, to be described in greater detail below in conjunction with the description of FIGS. 14 and 15, processes the delta elevation data over link 64 from elevation delta unit 53 and produces an output over link 77 representative of the range from the aircraft to the terrain for the data point of intrest. It also supplies, over link 67, data indicative as to whether or not the point of interest is visible or nonvisible from the aircraft, (e.g., the far side of ahill would be a nonvisible point), and the radar beam slant angle over line 68.

Figure 19:
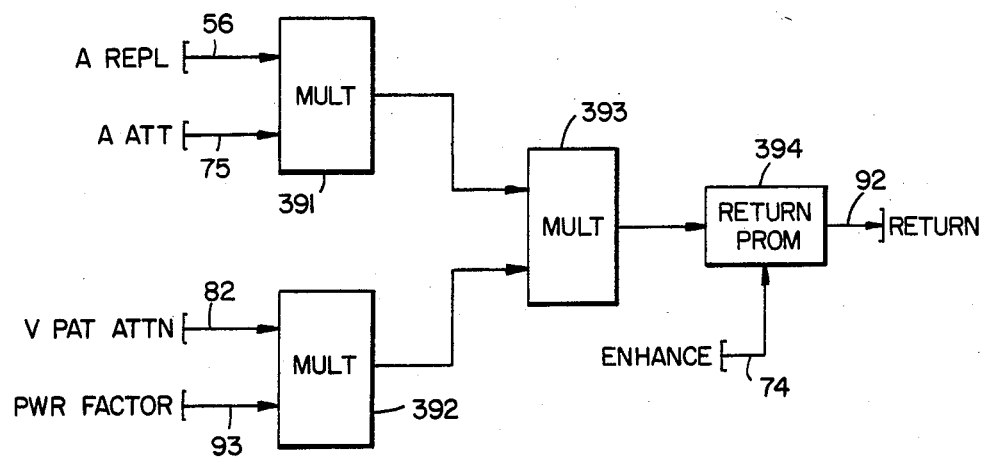
FIG. 19 shows, in schematic block diagram form, the details of return calculation unit 91 of FIG. 4.

The terrain aspect processing unit 71 responds to data over link 46 representatie of respective coordinate components of the ray of interest, slant angle data over line 68, and terrain slop data over link 65, and provides an output over line 72 indictive of the effective slope of the terrain at the data point of interest on the ray of interest. It also supplies an attenuation factor over link 75 to return calculation circuit 91 (to be described in detail below with reference to FIG. 19).

Look-up table 54, referenced above, is a programmable read only memory containing cultural data which responds to cultural information read out over link 52 from scene memory 10 and provides a set of cultural data over links 55, 56 and 57. On link 55, information representative of the height of ground characteristics of the terrain (for example, if the terrain is covered by forest, the heights of the trees), the reflectance characteristics of the terrain (again, if the terrain data point of interest is a forest, the reflectance characteristics of the trees of the forest (e.g. spruce foliage vs. oak foliage) and, on link 57, data representative of whether or not the data points of interest lies in the area of a far shore (namely, the aircraft is flying over water and the data point on the radar ray of interest lies in the vicinity of the terrain adjacent to the shore line, which normally creates an enhanced reflectance characteristic in that region). This far shore representative data is supplied to far-shore enhancement processing unit 73, which also receives slant angle information over line 68, the slope of the terrain over line 72, and whether the data point of interest is visible or invisible over link 67. Far-shore enhancement processing unit 73 produces, over output link 74, data indicative of the degree of enhancement of the intensity of the reflectance of the data point of interest based upon these parameters.

An additional component of the radar processing unit is a V-beam pattern processing unit 81 (to be described in detail below with reference to FIGS. 15 and 16). This unit responds to the slant anLle information over line 68 as well as a pair of inputs overlinks 83 and 84 defining the characteristics of the radar beam (for example, its vertical energy profile distribution and spreading angle). Typically, a radar beam has a maximum intensity along the center line or boresight of the beam and the intensity then decreases (for example, via a Gaussian energy distribution) on either side of the centerline of the beam. V-beam pattern processing unit 81 supplies attenuation data over line 82 corresponding to these factors.

In response to the terrain attenuation data over line 75, the reflectance data over line 56, far-shore enhancement data over line 74 and beam attenuation information over line 82, return calculation circuit 91 produces an output over link 92 indicative of the effective intensity of the reflected beam at the data point of interest on the ray of interest within the radar sweep pattern. This data is also affected by a parametric data representative code supplied over link 93 which is associated with the type of radar equipment that the digital radar generator is meant to simulate. For example, the parametric data is typically associated with gain, power, etc. of the T/R electronic and microwave components being simulated.

Both the effective reflectance return data on link 92 from return calculation unit 91 and the range data on link 77 from range calculation unit 63 are supplied to display processing unit 40, to be described below in conjunction with the description of FIGS. 20-32. Before describing the components of the display processing unit and the manner in which they operate to translate the reflectance return data for the individual data points within the radar sweep pattern to pixel intensity location data for display to the cockpit CRT, a description of the various units outlined briefly above of which radar pattern control unit 20 and radar processing unit 30 are configured will be described.

Figure 5:
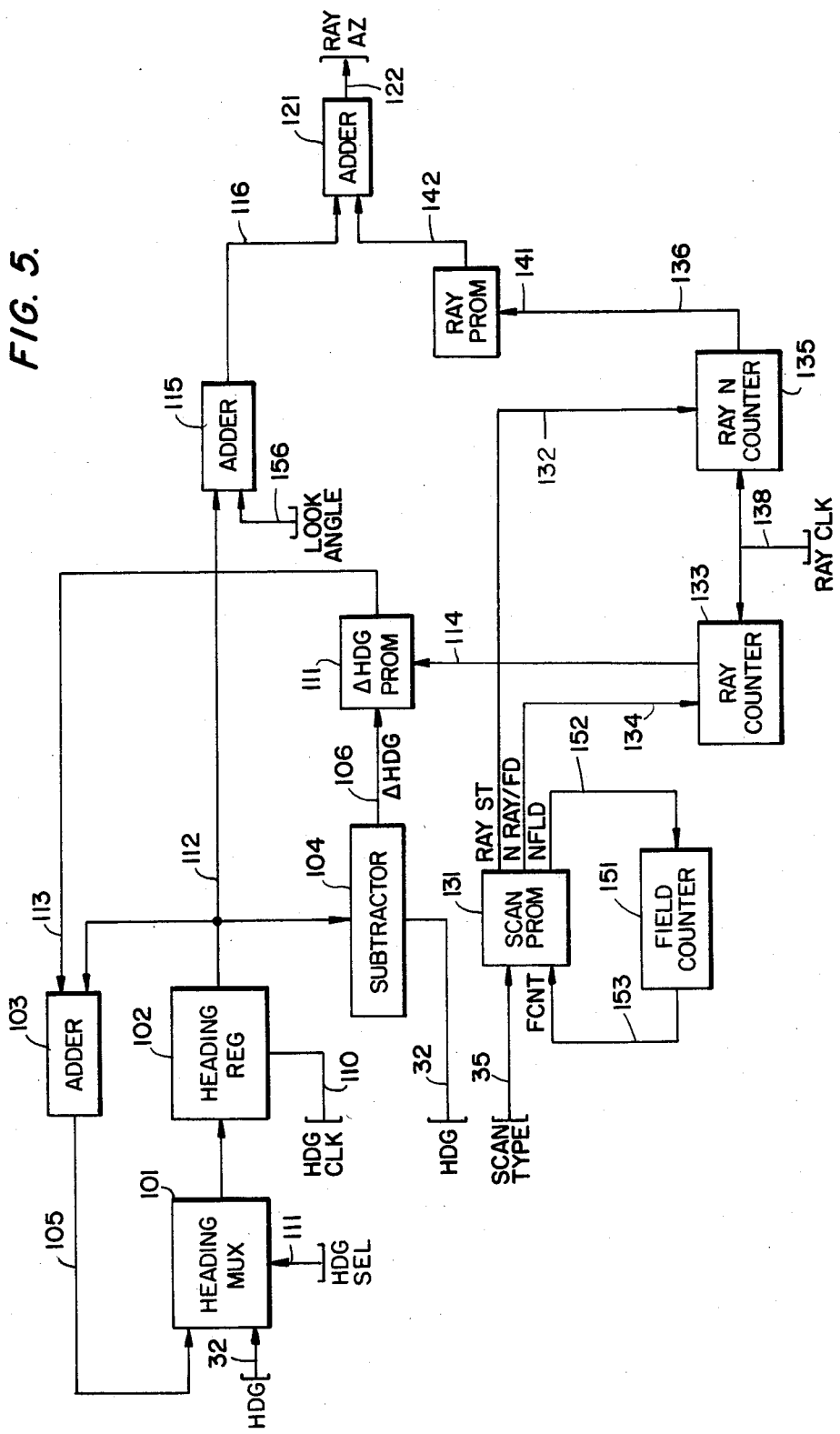
FIGS. 5 and 7 show, in schematic block diagram form, the details of ray address unit 41 of FIG. 4.

Referring now to FIG. 5, a block diagram of ray address unit 41 is shown. As mentioned previously, ray address unit 41 supplies output signals indicative of the addresses of the effective superposition or projection on the terrain map stored in scene memory 10 of successive data points along each of a plurality of rays emanating from the location of the aircraft 11 and extending radially outward within the sweep or scan angle of radar sweep pattern 12 (as shown in FIG. 2). While the radar sweep pattern 12 is shown as extending at an acute angle relative to a vertical line along the north-up axis in scene memory 10 in FIG. 2, it is to be recalled that on the face of the cathode ray tube, as viewed by the pilot observer within the aircraft, the radar sweep is normally with the heading of the aircraft up or vertical.

Figure 6:
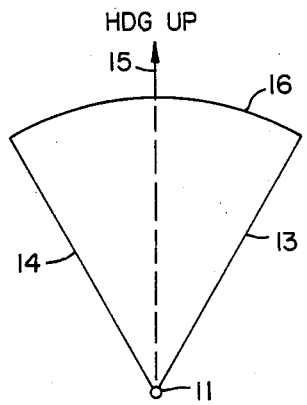
FIG. 6 shows a general illustration of a radar sweep pattern having a heading-up line of symmetry.

This is shown in FIG. 6 wherein the radar sweep 12 is disposed symmetrically about the heading 15 (oriented in a vertical-up direction) having edge boundaries 13 and 14. In the illustration of FIG. 6, the field of sweep of the pattern is assumed to be 60°, corresponding to that shown in the terrain map illustration of the contents of scene memory 10 in FIG. 2. This means that, regardless of the heading of the aircraft, the sweep pattern of the radar beam as presented to the cockpit display (and for a 0° look angle) is always disposed symmetrically about the heading of the aircraft. The heading of the aircraft, however, changes during the flight of the aircraft so that the location of a ray of interest within the sweep pattern, as superimposed on the terrain map, will change as the heading changes.

To provide for an adjustment of the position of a respective ray, regardless of the heading of the aircraft, ray address unit 41 monitors heading information supplied over link 32 from the aircraft's navigation avionics. Heading link 32 is supplied as one input to a subtraction circuit 104. Subtraction circuit 104 operates to provide an output over link 106 indicative of the difference of a previous heading of the aircraft and the current heading of the aircraft. By previous heading of the aircraft is meant a previously stored heading at a prescribed heading signal processing clock rate as governed by a clock signal over link 110. In other words, heading information is continuously updated at a prescribed signal processing clock rate and an adjustment is made for changes in the heading of the aircraft. The input to heading register 102 is coupled from a multiplexer 101, one input of which is coupled to link 32 to receive the heading of the aircraft from the navigation avionics and the other input of which is coupled over link 105 from an adder 103. One input of adder 103 is coupled to the output of register 102 over link 112 and another input is coupled over link 113 to a delta heading PROM 111. PROM 111 is a look-up table containing correction values for adjusting the rate at which the heading correction operation is carried out, as will be explained in more detail below. PROM 111 responds to the differential heading data on link 106 from subtraction circuit 104 and to adjustment rate data supplied on link 114 from a ray counter 133. Ray counter 133 counts clock signals supplied over ray clock input link 138 from a base value supplied over link 134 from a radar scan PROM 131. PROM 131 has an input coupled over link 35 to the cockpit control panel board whereat the pilot/observer inputs data indicative of the type of scan to be effected by the radar simulator. The type of scan data includes both the angle of sweep (e.g. 60°, 90°, 120°) and the speed of the sweep from one boundary 13/14 to the other boundary 13/14. From this information, scan PROM 131 supplies output data over link 132 indicative of the location of the start of the sweep and output data over link 134 indicative of the number of rays to be processed per video field time (e.g. 1/60 sec.). It also outputs data over link 152 to a field counter 151. The data on link 152 corresponds to the number of video field times that will be required to sweep the entire angle of sweep from one boundary to the other. Field counter 151 counts field clock time signals supplied thereto and supplies a clock field count over link 153 to PROM 131.

Ray address unit 41 also includes a ray counter 135 which counts the ray clock signals supplied over link 138 to both ray counter 133 and ray counter 135. Ray counter 135 is initially loaded with a value over link 132 indicative of the location of the edge of the sweep. As clock pulses are supplied over link 138, ray counter starts its count at the value supplied over link 132 and counts up. During this counting operation, the count value is supplied over link 136 as an address to a ray PROM 141. Ray PROM 141 converts the ray count values supplied over link 136 to azimuth data representing the effective azimuth of the ray relative to the vertical or up direction on the cockpit display. Adder 121, which receives the output of adder 115 over link 116 and the output of PROM 141 over link 142, adds heading information to the ray azimuth information and supplies a sum output over link 122 to indicate the effective azimuth of the ray of interest. A second input of adder 115 is coupled over link 156 and indicates the look angle of the radar boresight. For purposes of the present description, it will be assumed that the look angle of the radar boresight is 0°, namely it is aligned with the heading of the aircraft.

OPERATION

Considering now the operation of ray address unit 41, as heading information is supplied from the navigation avionics of the aircraft, it is coupled over link 32 to both heading multiplexer 101 and subtraction circuit 104. In response to a select signal on link 111, the heading information is coupled through multiplexer 101 and clocked into register 102 via a clock signal supplied over link 110. Thereafter, heading select link 111 switches the output of multiplexer 101 to the input 105 supplied from adder 103. As heading information is supplied over link 32, it is compared with the contents of register 102. Any difference between the current heading of the aircraft and the heading written into register 102 during the last clock time of the clock signal supplied over link 110 is coupled over link 106 to PROM 111. As mentioned previously PROM 111 provides an adjustment factor for the rate at which the heading information is updated. This is achieved by a division value supplied over link 114.

More specifically, as mentioned above, one of the inputs of ray counter 133 is an output from PROM 131 which indicates the number of rays per video field processing time. When the heading of the aircraft changes, the location of the ray of interest relative to that heading is not changed suddenly in one large ray shift or excursion, but is changed gradually, as would normally be the case for a conventional scan of the T/R antenna equipment in the aircraft as the heading of the aircraft changes. It is to be recalled that what is being simulated on the face of the cockpit CRT display is the sweep of a radar beam, rather than an individual ray. A field may be comprised, for example, of 28 rays. As ray counter 133 is decremented by ray clock 138, the number of rays being processed changes from 28, . . . to 27, . . . to 26, . . . etc. This ray count is supplied over link 114 to PROM 111. PROM 111 divides the heading differential supplied over link 106 by the number of rays in the field yet to be processed and supplies this correction factor over link 113 to adder 103. As a result, the contents of heading register 102 are updated by the value of the current heading plus the differential heading value supplied over link 106 divided by the number of rays in the field yet to be processed. Eventually, as all of the rays are processed the number will be reduced to the value "one" so that the value in the heading register is equal to the old heading plus the differential heading coupled at the output of subtraction circuit 104. Thus, as the rays of a respective field are sequentially processed, namely the number of rays in the field remaining to be processed decreases, the adjustment factor provided by PROM 111 changes accordingly, to provide a gradual adjustment of heading information stored in register 102. For each individual ray, the relative position of that ray in terms of the heading of the aircraft is computed by adder 121 which sums the heading information over link 116 and the ray information over link 142 to supply respective ray azimuth data over link 122. This azimuth information is coupled to the scene address portion of ray address unit 142 shown in FIG. 7.

More particularly, the scene address portion of ray address unit 41 produces the X, Y address signals to be coupled to square address unit 43 for accessing data from the scene memory 10. These X, Y address signals are for the respective points on respective rays of the radar sweep pattern. The ray data on link 122 at the output of adder 121 is coupled to a sine azimuth PROM 161 and a cosine azimuth PROM 162. The output of sine azimuth PROM 161 on link 164 corresponds to an incremental unit in the X direction (East in terms of the stored scene memory data) while the output of cosine azimuth PROM 162 corresponds to an incremental unit in the Y direction (North). Thus, for a ray (i) of interest, as shown in FIG. 3 referenced previously, the output of sine azimuth PROM 161 will be the value $\Delta X_{ray(i)}$ while the value of cosine azimuth PROM 162 will be the value $\Delta Y_{ray(i)}$ representative of the incremental distance, in orthogonal components, between successive data points along that ray.

The outputs of PROMs 161 and 162 are coupled to respective offset PROMs (sine offset PROM 174 and cosine offset PROM 184) the outputs of which are coupled as one input to respective multiplexers 175 and 185. The other inputs of the multiplexers are respectively connected to the output of sine PROM 161 and cosine PROM 162, respectively. Depending upon the ray of interest, multiplexer control input link 170 will cause multiplexers 175 and 185 to select either the output of the offset PROM or the output of the sine/cosine PROM, directly. Each of offset PROMs 174 and 184 introduces the initial offset for respectively adjacent rays of the data points relative to one another, in the manner shown in FIG. 3, discussed above, to ensure complete coverage of the data points in the scene memory for adjacent rays of the radar beam sweep pattern.

The outputs of multiplexers 175 and 185 are coupled over respective links 176 and 186 to adders 173 and 183. The output of adder 173 is coupled over link 192 directly to a register 193 and to a logic circuit 191. Logic circuit 191 examines the output of adder 173 and determines whether or not the address value produced therefrom lies in a portion of scene memory 10 in which no data is stored, namely it lies at a boundary between blocks of memory.

Figure 8:
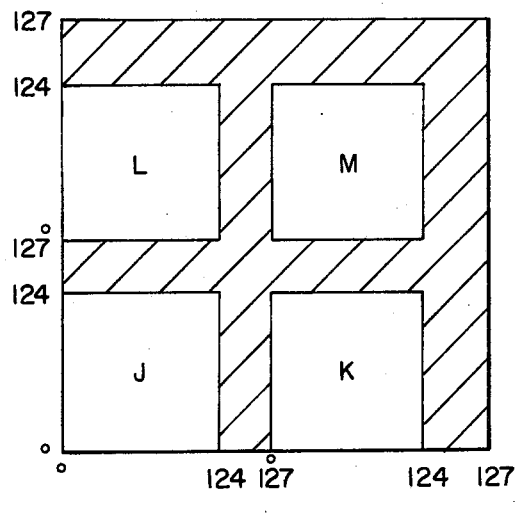
FIG. 8 shows a portion of the blocks of terrain map data as stored in the scene memory.

More particularly, in the scene memory 10, each block of grid points is comprised of a matrix of 128×128 address locations. However, in the actual mapping of terrain data, only 125×125 locations contain data. This is illustrated in FIG. 8 wherein a portion of the terrain data in scene memory 10, identified by data blocks J, K, L, M is shown as containing 125×125 data-containing memory locations (0–124×0–124) and a separate group of non-data containing memory locations for memory addresses 125 through 127. Logic circuit 191 determines whether the data point of interest falls in the shaded area and, if the address of the data point of interest falls in the shaded (no data) area, it prevents the contents of X register 193 from being incremented to that address location. The output of register 193 is coupled over link 202 as the X address portion of the ray data point of interest. Link 202 is coupled back to one input of adder 173 and to an input of X start multiplexer 171. A second input of multiplexer 171 is coupled over link 33 to receive the X start location of the ray of interest. This X start location corresponds to the location of the observer or aircraft from which the radar beam being simulated emanates. (Adder 183, logic circuit 194, Y register 196 and multiplexer 181 correspond effectively to similar components in the Y address portion of the circuit and a Y address representative code is supplied over link 203.)

OPERATION

In order to generate X and Y address pairs for the respective points along individual rays of the radar sweep pattern, the X and Y component values referenced above in connection with FIG. 3 are added to the start point values supplied over links 33X and 33Y to multiplexers 171 and 181. At the beginning of an incrementing of data points along a respective ray, each of multiplexers 171 and 181 couples the start values over links 172 and 182, respectively, through adders 173 and 183 to registers 193 and 196. Thus, the initial address is the location of the observer or aircraft. The actual start point of a data point along the ray will depend upon the ray of interest and the increment value for that ray at the start point. For example, for ray (i+1), as shown in FIG. 3, the start point (or data point $DP(i+1)_1$) is displaced from the observer by the value $\Delta R/2$. This offset is supplied by each of offset PROMs 174 and 184 and added to the start point supplied over each of links 33X and 33Y in adders 173 and 183. The value is then stored in registers 193 and 196 in response to an address clock supplied over link 201. Thus, the X address and Y address supplied over links 202 and 203 for ray (i+1) will specify data point $DP(i+1)_1$ in terms of its $\Delta X$ and $\Delta Y$ values. Thereafter, unitary offset values for the successive data points along ray (i+1) are added to the contents of registers 193 and 196 as the contents of these registers are fed back through multiplexers 171 and 181 to adders 173 and 183. In other words, the contents of registers 193 and 196 are successively incremented by adding thereto the respective $\Delta X$ and $\Delta Y$ increment values from PROMs 161 and 162 which are coupled through multiplexers 175 and 185 by passing offset PROMs 174 and 184, which offset PROMs are used initially only for the starting data points. Thus for successive data points $DP(i+1)_2$, $DP(i+1)_3$ etc., corresponding X and Y addresses of these data points will be generated. These address values are supplied to square address unit 43 shown in FIG. 9.

The square address unit 43 is comprised of a set of interconnected registers and multiplexers and associated logic circuitry for generating the addresses of a set of four adjacent points closest to an identified data point on a ray of interest, as well as other information associated with that point required for radar return processing. In order to facilitate an understanding of the make-up and operation of the square address unit, the description thereof will be accompanied by reference to FIG. 10 which shows, diagrammatically, a portion of a ray (i) as superimposed on the matrix of grid points stored in the scene memory 10 and illustrations of associated elevation values at the grid points of the terrain map.

Figure 10:
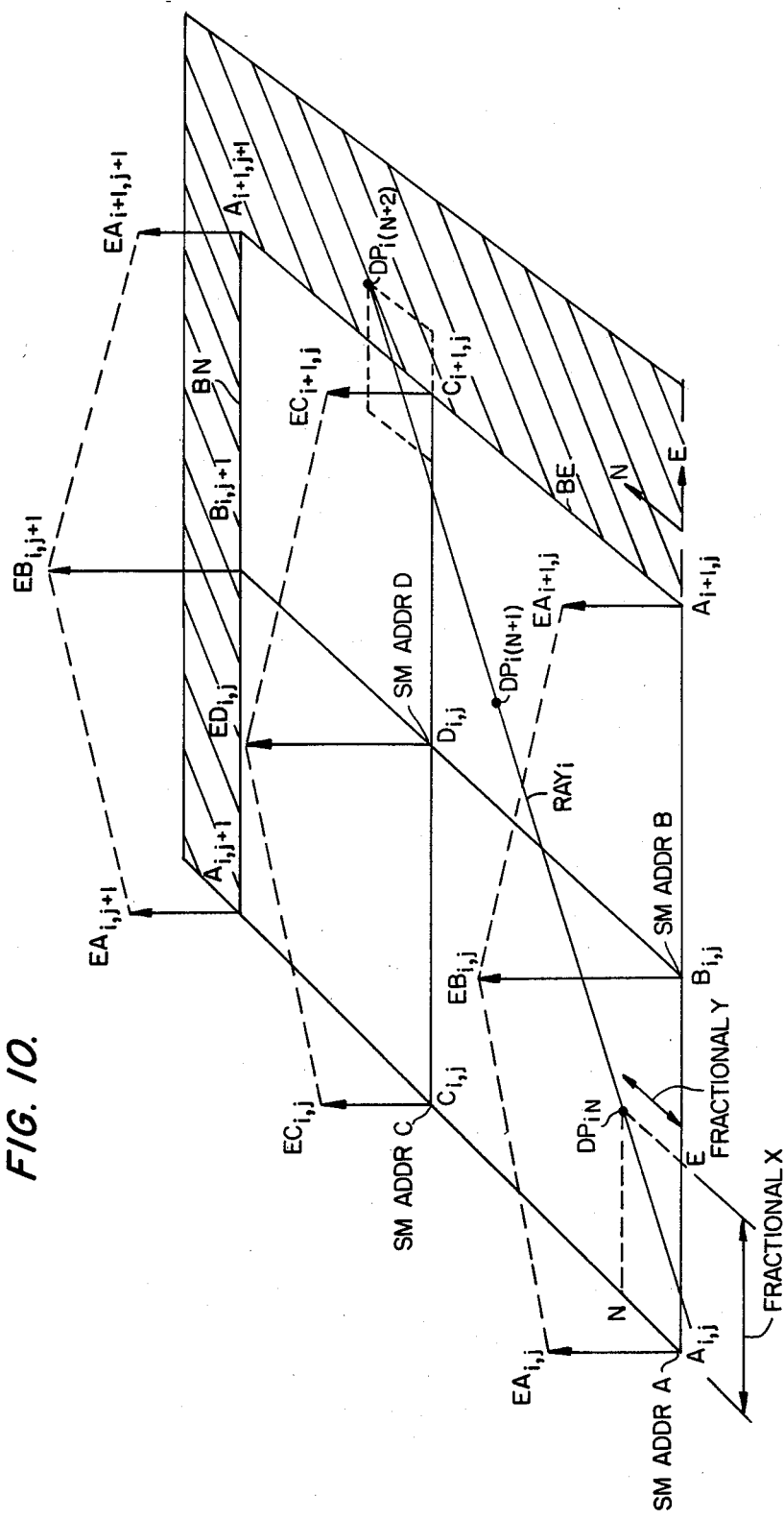
FIG. 10 is a pictorial representative of address locations and associated elevation data values for a set of grid points of the terrain map stored in scene memory.

The illustration of FIG. 10 shows a portion of the terrain map, specifically nine grid points $A_{i,j}$ . . . $A_{i+1,j+1}$ among which ray (i) passes. On ray (i), there are three data points identified as data points $DPi_n$, $DPi_{n+1}$ and $DPi_{n+2}$. The nine grid points shown are located adjacent to respective north and east boundaries of a block of memory, discussed previously in conjunction with the description of FIG. 8. Elevation values for each of the grid points are shown as arrows extending upwardly from the grid points and identified by the character E and a reference character associated with the grid point.

For purposes of illustration, consider initially a data point $DPi_n$ on ray (i) which falls within a square of the terrain map bounded by grid points $A_{i,j}$; $B_{i,j}$; $C_{i,j}$ and $D_{i,j}$. For each of these associated grid points, there are respective elevation values, $EA_{i,j}$; $EB_{i,j}$; $EC_{i,j}$ and $ED_{i,j}$. These elevation representative arrows are shown as being connected by broken lines, as are the other arrows shown for the elevation values in FIG. 10, so that the drawing pictorially shows a sloping of the terrain through the interconnection through the tips of the arrows.

Figure 9:
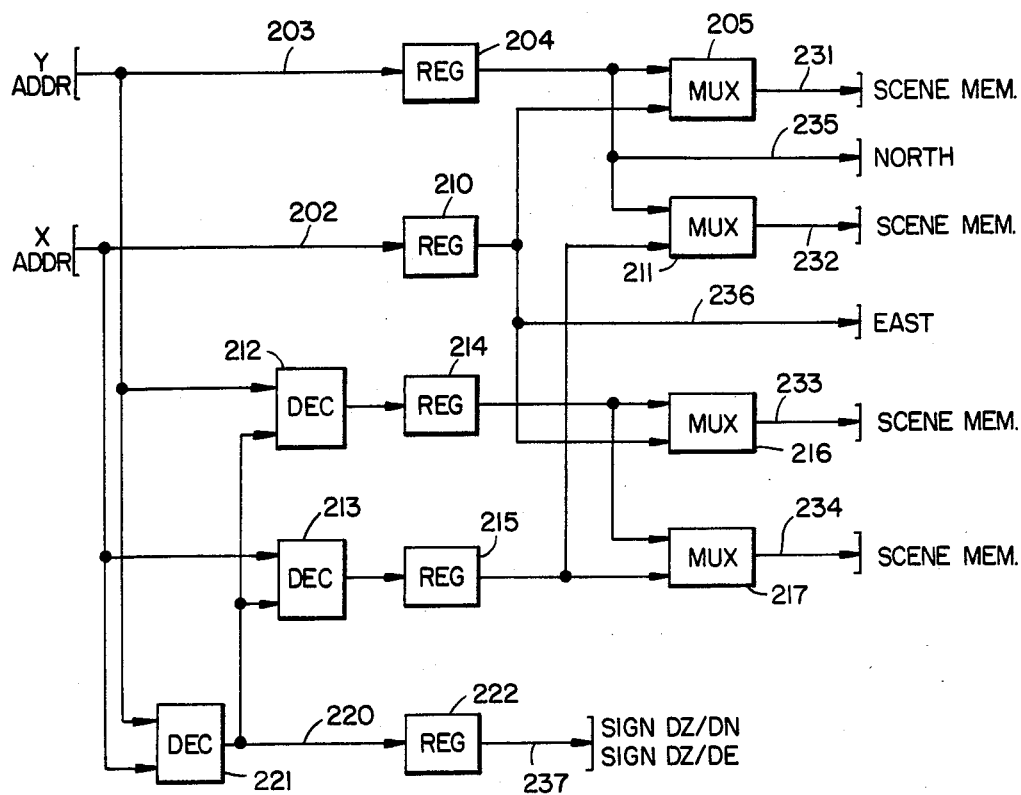
FIG. 9 shows, in schematic block form, the details of square address unit 43 of FIG. 4.

Now, in the square address unit of FIG. 9, for the data point $DPi_n$, there are respective X and Y address values coupled over links 202 and 203 from the ray address unit 41, described previously. These address values are coupled to registers 210 and 204, logic circuits 213 and 212 and a block boundary detection logic circuit 221. Logic circuits 213 and 212 operate to couple the address codes on links 202 and 203 to registers 215 and 214, respectively, as long as the address of the data point does not fall beyond the map boundaries of the block of data, namely within the shaded areas shown in FIGS. 8 and 10. A determination of whether the data point of interest falls within the shaded area is determined by the magnitude of the address. As noted previously, although the memory itself is blocked out into 128×128 grid points per block, the data is mapped in only a 125×125 matrix array (i.e. X addresses 0 . . . 124 and Y addresses 0 . . . 124), so that for grid address points 125 . . . 127, no map data is stored. Block boundary detection logic circuit 221 detects whether the data point (i.e. its address value) falls within this boundary area and provides an output over link 220 should the address of the data point fall within a boundary portion of the block where no useful map data is stored. This would occur in the illustration of FIG. 10, for example, for data point $DPi_{n+2}$. Here, the east or X address value extends beyond the boundary of useful data, although the Y value is still less than the Northern boundary line $B_N$, so that the most useful eastward address value of 124 would be exceeded by the address code for data point $DPi_{n+2}$. Namely, beyond boundary line $B_E$, denoting the eastward most edge of useful data for the block of data of interest in the scene memory, all grid points have an east or X value above 124. For northern boundary line $B_N$, all grid points beyond this line have a Y value above 124. As shown in FIG. 10, the address for data point $DPi_{n+2}$ falls beyond the eastern boundary line $B_E$ but not beyond the northern boundary $B_N$. Accordingly, logic circuit 221 will couple data over link 220 to be stored in register 222 indicating that the X address of the data point falls beyond the boundary line $B_E$ but not beyond the boundar $B_N$. In effect, a "1" bit is generated for the X address indicating that the eastern boundary has been exceed while a "0" bit is associated with the Y address indicating that the northern boundar $B_N$ with the block of data of interest has not been exceeded. The use of these bits will be explained below.

Referring again to the data point $DPi_n$ which falls within the lower left hand square of the block of grid points illustrated in FIG. 10, address values for the respective grid points are coupled to output links 231, 232, 233 and 234 from the outputs of multiplexers 205, 211, 216 and 217, respectively. Specifically, those bits of the X and Y address for data point $DPi_n$ which define the addresses of grid points $A_{i,j}$, $B_{i,j}$, $C_{i,j}$ and $D_{i,j}$ are coupled from registers 204, 210, 214 and 215 through multiplexers 205, 211, 216 and 217 to produce scene memory addresses for accessing the elevation and cultural values from the addresses associated with these respective grid points.

In addition, the least significant and fractional bits of the contents of registers 204 and 210 are coupled over links 235 and 236, respectively, to identify the precise location of data point $DPi_n$ within the block bounded by grid points $A_{i,j}$, $B_{i,j}$, $C_{i,j}$ and $D_{i,j}$. On link 236, the nonfractional bit identifies whether the grid point is associated with the grid points $A_{i,j}$, $C_{i,j}$ or the grid points $B_{i,j}$, $D_{i,j}$, while the fractional bit defines that portion of the grid point separation in the X or eastward direction. Similarly, on line 235, the nonfractional bit identifies the address in the north or Y direction, namely the Y component of the grid points $A_{i,j}$, $B_{i,j}$ or grid points $C_{i,j}$, $D_{i,j}$. Similarly, the fractional bits identify the fractional portion between the grid point separations in the Y or northerly direction. From these values, it can be seen that the grid point in the terrain map matrix which is closest, in terms of its address, to the data point $DPi_n$ is grid point $A_{i,j}$. Namely, the address of data point $DPi_n$ will be the address of grid point $A_{i,j}$ plus a fractional component in both the eastward and northward directions. This data is coupled over links 231-236, as described above.

In the above example, the location or address of data point $DPi_n$ does not fall beyond the boundary of the terrain map grid matrix, whereas data point $DPi_{n+2}$ falls beyond the eastward most boundary $B_E$. In that instance where the data point falls beyond a boundary, it is not possible to use the closest grid point plus a fractional portion relative to that grid point for an address, since the data point falls in a location where there is no useful data to be derived. In such a case, the immediately proceeding block, in a direction opposite to that where the boundary is exceeded, is employed as the block from which associated A, B, C and D addresses will be generated. Thus, for data point $DPi_{n+2}$, the fact that the eastward boundary $B_E$ is exceeded produces a "1" bit for the X or eastward direction on line 237, which is also coupled to logic circuits 212 and 213, so that the four grid points associated with data point $DPi_{n+2}$ will be grid points $A_{i+1,j+1}$; $B_{i,j+1}$; $C_{i+1,j}$ and $D_{i,j}$.

As discussed previously, on output link 237, a sign bit is provided for each of the east and north directions, to indicate whether or not a boundary has been encountered. If a boundary has been encountered, as is the case with the above-discussed data point $DPi_{n+2}$, the four grid points of interest are located in a grid point square immediately prior to crossing the boundary (here east boundary line $B_E$). Namely, positive incrementing of the X and Y directions along ray (i) has been interrupted by boundary $B_E$ for data point $DPi_{n+2}$. This means that address values and corresponding elevation values associated with those address values in the previous block encompassed by grid points $A_{i+1,j+1}$; $B_{i,j+1}$; $D_{i,j}$ and $C_{i+1,j}$ undergo a change in slope opposite to that indicated by the elevation values for the points addressed in that block. It so happens for the illustration shown in FIG. 10 that there is a decrease in slope, as viewed along ray (i) for the above-referenced grid points. In terms of the elevation values for this matrix block, however, the slope would appear to be increasing. By reversing the sign of the change in slope in the eastwardly direction, however, what would be an erroneous interpolation of the elevation for the data point of interest based upon elevation values at each of the points of the grid block is avoided. These sign bits are applied to the elevation delta processing unit 53 described below with reference to FIGS. 11 and 12.

Figure 11:
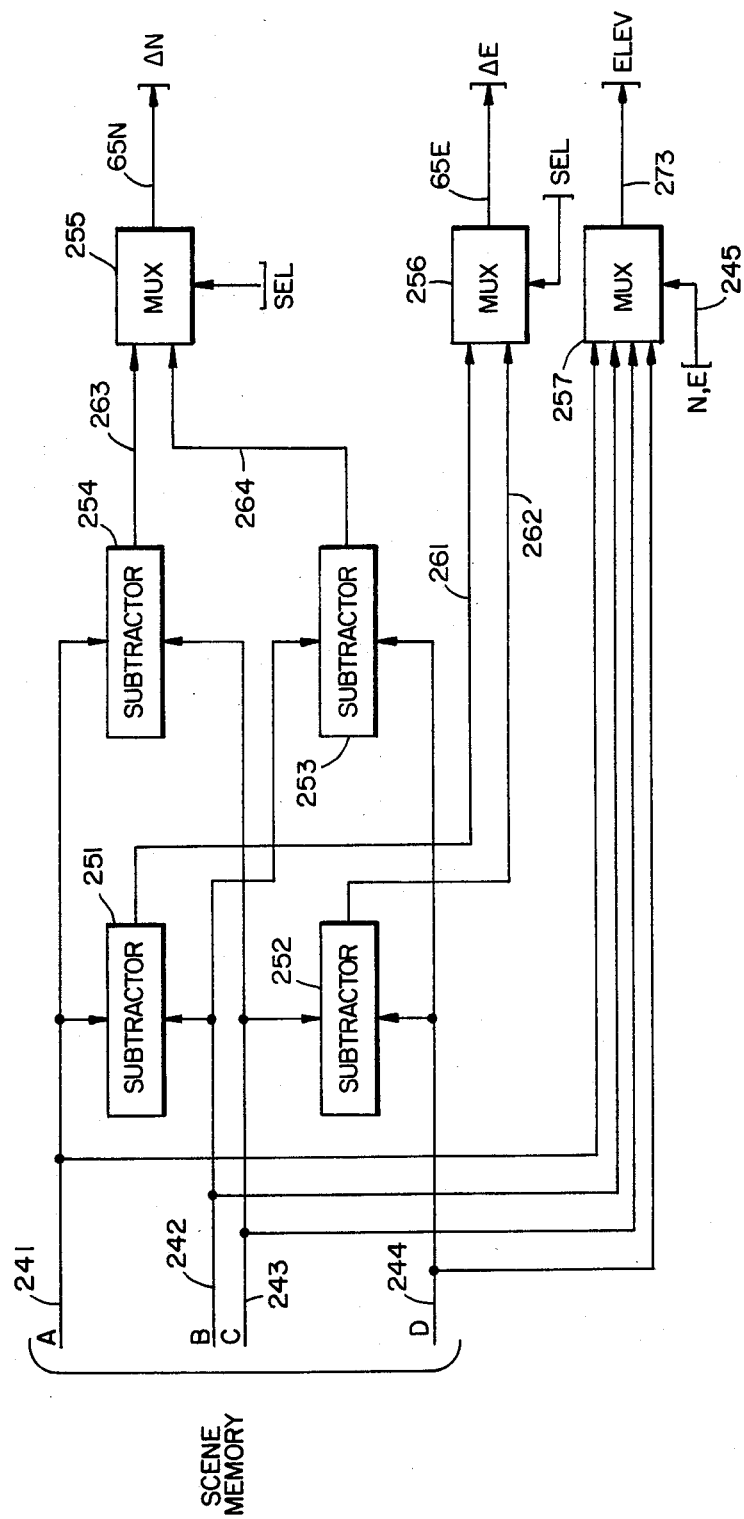
FIGS. 11 and 12 show, in schematic block diagram form, details of elevation delta unit 53 of FIG. 4.

Referring now to FIG. 11, the elevation values for the respective grid points of the block within which the data point of the ray of interest (such as data point $DPi_N$ for grid points $A_{i,j}$; $B_{i,j}$; $C_{i,j}$ and $D_{i,j}$ in FIG. 11), namely elevation values $EA_{i,j}$, $EB_{i,j}$, $EC_{i,j}$ and $ED_{i,j}$, are applied as inputs over respective links 241, 242, 243 and 244. The elevation values for the grid points A and B of the square of interest are subtracted in subtraction circuit 251 and the difference (EA−EB) is applied as one input to multiplexer 256. Similarly, the elevation values at the grid points C and D for the square of interest are subtracted in subtraction circuit 252 and the difference as coupled over link 262 as the other input to multiplexer 256. Each of these inputs to multiplexer 256 represents a difference in slope in the eastwardly direction.

Similar calculations are carried out for the differences in the elevation values for points A and C and points B and D in subtraction circuits 254 and 253 and applied to multiplexer 255. Thus, over links 65N and 65E are provided respective signals indicating differences in elevation values in a northerly and easterly directions for respective pairs of grid points.

The elevation values themselves are further supplied as respective inputs to multiplexer 257, the output of which is coupled over link 273. According to the address values for defining the address of the data point of interest, one of the grid points A, B, C or D will be identified as the reference point for the data point on the ray of interest. For the example shown in FIG. 10, for data point $DPi_n$, the address of grid point $A_{i,j}$ is this reference point address, so that elevation value $EA_{i,j}$ is the reference elevation value. Thus, the least significant bit or non-fractional bit of the X address and the least significant or non-fractional bit of the Y address for the data point on the ray of interest is coupled over link 245 and addresses multiplexer 257. This causes data link 241 to be coupled to output link 273, so as to supply the elevation value (here $EA_{i,j}$ for data point $DPi_n$) to output link 273.

Figure 12:
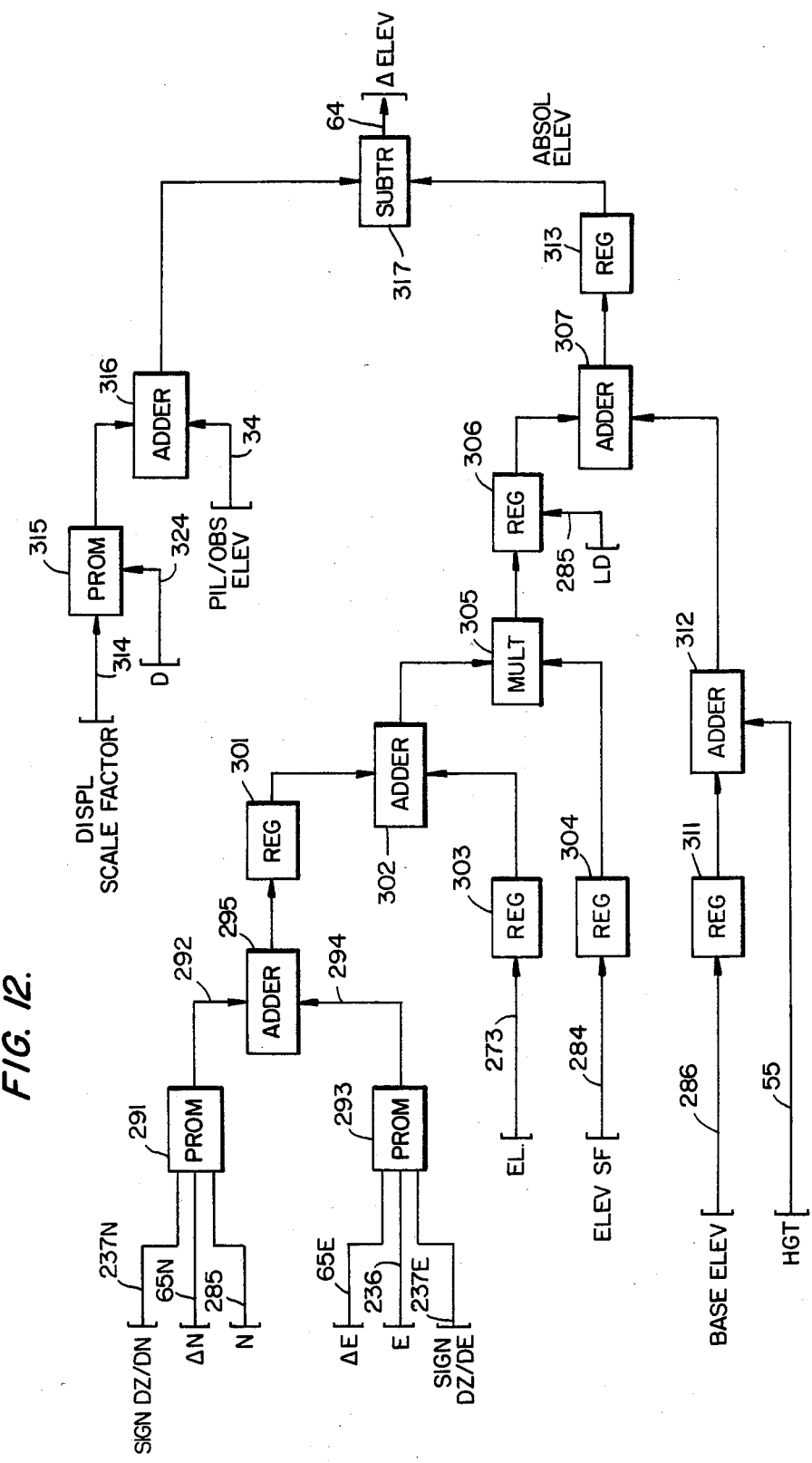

The respective slope differential pairs are coupled over links 65E and 65N as inputs to PROMs 293 and 291, respectively, shown in FIG. 12. Also applied as inputs to these PROMs are their fractional bits for the respective east and north directions, derived from links 236 and 235, shown in FIG. 9, referenced previously, as well as the sign of the change of slope in the northern and easterly directions as coupled over link 237. In FIG. 12, link 237N couples the bit representative of any change in slope in a northerly direction as stored in register 222 (FIG. 9), while link 237E carries the bit indicative of a change in slope in the eastwardly direction as derived from register 222. In the example shown in FIG. 10, as mentioned previously, for data point $DPi_{n+2}$ there will be a change in slope in the eastwardly direction, so that the bit supplied over link 237E will be a "1", as supposed to a "0" which takes place when the slope values are not reversed, as would occur where there is a reference back to a previous block at a boundary, such as boundary $B_E$ in the easterly direction for data point $DPi_{n+2}$, as discussed above.

In response to these respective east and north data inputs, PROMs 293 and 291 supply outputs over links 294 and 292 to adder circuit 295. PROMs 291 and 293 supply scale values for the elevation at the grid points of interest to be added to the elevation obtained from the reference grid point (namely elevation value $EA_{i,j}$ for grid point $A_{i,j}$ associated with data point $DPi_n$ in FIG. 10). The summation value is stored in register 301 and supplied as one input to an adder input 302. The other input of adder 302 is coupled over link 273 and stored in register 303. This input is the elevation value for the reference grid point, namely grid point $A_{i,j}$, referenced above. Thus there is added to the elevation at the reference grid point a scale adjustment elevation value based upon the differential in slope for the elevation values of the corners of the associated grid square to provide an interpolation for the elevation at data point $DPi_n$ on the terrain map. This interpolated value is provided by the output of adder 302 and supplied as one input to a multiplier 305.

A second input of multiplier 305 is coupled over link 284 and stored in register 304. This input is a code representative of the scale factor used in scaling the data for storage in the scene memory 10 and is preestablished prior to system operation. As a result, the scaled elevation value supplied from adder 302 is rescaled by multiplier 305 and stored in register 306. Link 285 supplies a timing signal for storing the output of multiplier 305 in register 306. The contents of register 306 are applied as one input to an adder 307. The other input of adder 307 is derived from the output of adder 312. Adder 312 sums two inputs. The first is coupled over link 55 which, as noted previously, supplies cultural data from a lookup table 54 indicative of the height of natural characteristics of the terrain, such as shrubbery, trees, etc. This value is added to a base elevation value supplied over link 286 and stored in register 311.

More specifically, in the process of storing data in the scene memory, absolute altimeter data referencing sea level as a base point is not necessarily stored. For example, when the terrain of interest is inland and substantially above sea level, the difference between the lowest base point and sea level is subtracted out during the compression and storage of data in the scene memory and later added back into the decompression of the data during read out. This adjustment factor is what is supplied over link 286 and stored in register 311. Namely, the absolute altitude of the lowest point in the terrain map being examined is coupled over link 286 and supplied from register 311 as the other input to adder 312. Thus, the output of adder 307 is a summation of three quantities: (1)— absolute altitude between sea level and the lowest reference point in the terrain map elevation data stored in scene memory (as supplied over link 286); (2)— the height of cultural aspects of the terrain above the ground (height of trees of a forest) supplied over link 55; and (3)— the interpolated elevation for the data point of interest within the square of grids points whose elevation values have been extracted to effect that interpolation as supplied from register 306. This provides the absolute elevation of the reflecting surface that would be impinged by the radar beam from the aircraft at the data point of interest on the terrain relative to a reference altitude, such as sea level.

This quantity is stored in register 313 and applied as one input to a subtraction circuit 317. The other input of subtraction circuit 317 is supplied from adder 316. Adder 316 adds the altimeter data from the aircraft, indicative of the altitude of the observer or aircraft supplied over link 34 and an earth curvature correction value based upon the display scale factor being employed as supplied over link 314, and the scaled ground distance from the aircraft to the point of interest as supplied over link 324, to access a PROM 315 to supply an earth curvature correction. Thus, adder 316 supplies an output corresponding to the effective absolute altitude of the aircraft. Subtraction circuit 317 thereby calculates the difference in the height of the aircraft and that of the terrain at data point $DPi_n$ and supplies this difference output over link 64 to range calculation unit 63, shown in detail in FIG. 14, described below.

Figure 13:
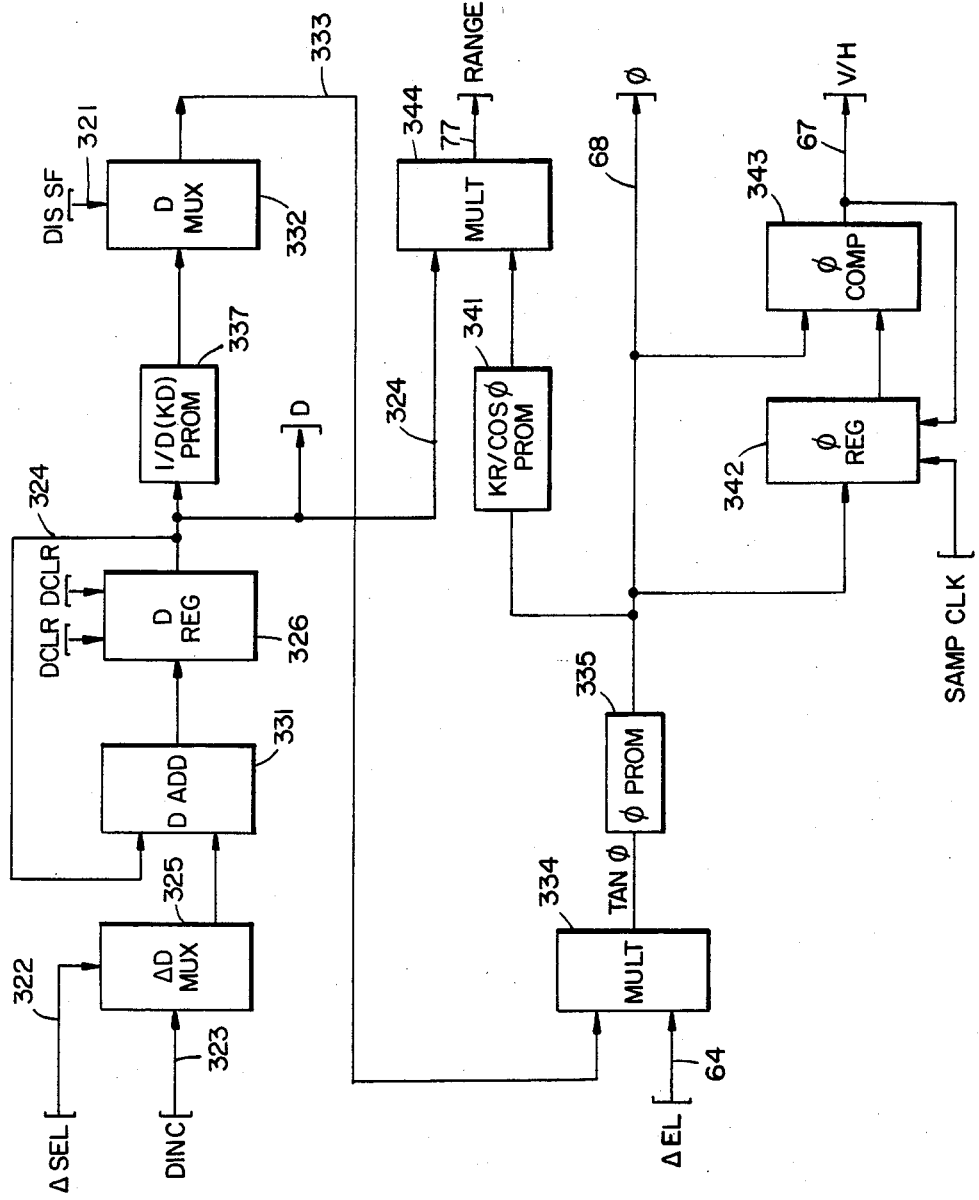
FIG. 13 shows, in block diagram form, the details of range calculation unit 63 of FIG. 4.

Range calculation unit 63 effectively implements the equation $R = D/\cos\phi$, wherein $\phi = \arctan \Delta E/D$. In this expression, $\Delta E = E_{obs} - E_{DP}$, where $E_{obs}$ is the elevation or altitude of the observer and $E_{DP}$ is the absolute height of the data point of interest. Namely, $\Delta E$ is the data value supplied from subtraction circuit 317 in FIG. 12, coupled over link 64 as one input to multiplier 334 in FIG. 13. These values are more clearly shown in the graphical illustration of FIG. 14, which shows the depression angle $\phi$, i.e. the angle between a line from the aircraft to the data point of interest and a line of level flight for the aircraft at that altitude. A vertical projection from the aircraft to the terrain identified at point 11, shown in FIG. 2, is the location of the aircraft or observer on the terrain map. The circuitry of FIG. 13 effectively carries out the above equations to derive the range R on line 77, the depression angle $\phi$ on line 68 and whether or not the data point of interest is visible or hidden on line 67.

More specifically, for the ray of interest, a ground distance displacement value D, coupled over link 323, corresponding to the displacement between data points along the ray, as discussed above in conjunction with FIG. 3, is shifted to an appropriate start point by a control input over link 322. This output from multiplexer 325 is coupled to adder 331, the output of which is connected to register 326, to supply a ground distance displacement value D over output link 324. This link is coupled back to the other input of adder 331 to provide the sequential incrementing of the contents of 326 from the initial displacement start point, which is a fraction of the separation distance depending upon the ray of interest, as pointed out above in conjunction with the description of FIG. 3. The displacement value is then coupled to a PROM 337, which outputs a value corresponding to a multiplying coefficient divided by the increment unit for the distance D to provide a displacement quantity in terms of meters. This quantity is then scaled by a displacement multiplexer 332 in response to a display scale factor control input over link 321 to provide a quantity 1/D mutiplied by a scale factor, corresponding to the actual ground distance in meters for the distance D from the location of the aircraft as projected on the terrain map to the data point of interest, over link 333. Thus, the inverse of the actual distance in meters from the projection of the aircraft to point 11 on the ground to the location of the data point is supplied as one input to multiplier 334. This quantity is then multiplied by the elevation differential value coupled over line 64, so that the output of multiplier 334 is the value $\Delta E/D$. This quantity addresses an arctan lookup table PROM 335 which produces the actual depression angle $\phi$ on the output link 336. The depression angle value is then applied to a scaled 1/cosine $\phi$ PROM 341 to produce an output KR/cos $\phi$ as one input to a multiplier 344. This quantity is then multiplied by the previously unscaled value supplied over link 324, so that multiplier produces an output over link 77 corresponding to the range $R = D/\cos \phi$.

To determine whether the data point is hidden, such as would be the case where the data point lies on the hidden far side of a hill, the value of $\phi$ on link 68 is coupled to a register 342 and a comparator 343. Comparator 343 compares the current output of PROM 335 with the contents of register 342, which stores the value of the depression angle for a previous calculation or sample time. Where the value of a depression angle at a current sample time exceeds that of a previous sample time by prescribed value, it is determined that the data point of interest is hidden, and a bit indicative of that characteristic of the data point, which necessarily will not be projected on the cockpit CRT display, since it is hidden, is provided over link 67 to terrain aspect calculation unit 71 and far-shore enhancement calculation unit 73 to be described below. The range value is supplied to the display processing unit to be used to establish where on the cockpit CRT display a pixel will be energized to provide data indicative of the reflectance return from that data point.

As pointed out above, output links 67 and 68 from range calculation unit which supply data representative of whether or not the data point of interest is visible or hidden and the depression angle $\phi$, respectively, are coupled to terrain aspect calculation unit 71 and far-shore enhancement unit 73, while link 68 is coupled to vertical beam pattern PROM 81. These units, together with reflectance look-up table (PROM) 54, supply beam modification data which are processed by calculation unit 91 to produce a radar return-representative value on link 92 from which a corresponding pixel intensity representative code is generated for presentation to the cockpit CRT display. This beam modification data consists of attenuation data, namely, the degree of attenuation of the beam reflected off the terrain and returned to the aircraft, the reflectance characteristics of the terrain, any far-shore enhancement, and the attenuation of the ray of interest in accordance with its position within the beam (its contribution to the energy distribution over a vertical cross-sectional slice through the beam).

Considering now the configuration and operation of the above-referenced units, vertical beam pattern unit 81 is comprised of a PROM which stores beam attenuation factor values that are derived in accordance with the slant angle of the radar boresight, the slant angle of the ray of interest in the beam and the spread of the beam. These factors are identified in FIG. 15 which illustrates the vertical or downward spread of beam 12 from aircraft 11, relative to its flight path 15. As shown in FIG. 15, the beam centerline or boresight axis 100 has a slant angle $\alpha$ relative to flight path 15. The beam itself has a spread angle $\beta$ about beam centerline 100, bounded by upper edge or ray 110 and lower edge or ray 120. Typically, the beam intensity profile (energy distribution across the beam) is maximum along the boresight axis and tapers to a minimum value at the extremities of the spread angle, as represented by the energy distribution, characteristic 130 which, in the example shown in FIG. 15, is Gaussian.

For accessing the attenuation factor values, links 83 and 84 provide pilot-generated codes (cockpit panel switch settings) corresponding to the boresight slant angle $\alpha$ and the beam spread angle $\beta$, respective. As each ray is processed, its slant angle $\phi$, as calculated by range calculation unit 63 described above, is coupled as the third address component for PROM 81 over link 68. In response to these values, vertical beam pattern PROM 81 generates the corresponding attenuation factor for the ray of interest which factor is coupled over link 82 to return calculation unit 91.

Figure 18:
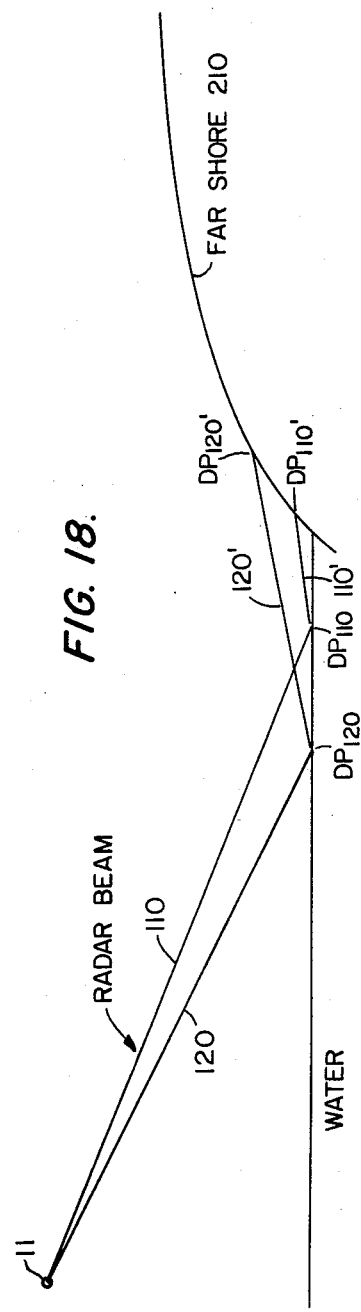
FIG. 18 is a diagram for explaining the operation of far-shore enhancement unit 73 of FIG. 14.
Figure 16:
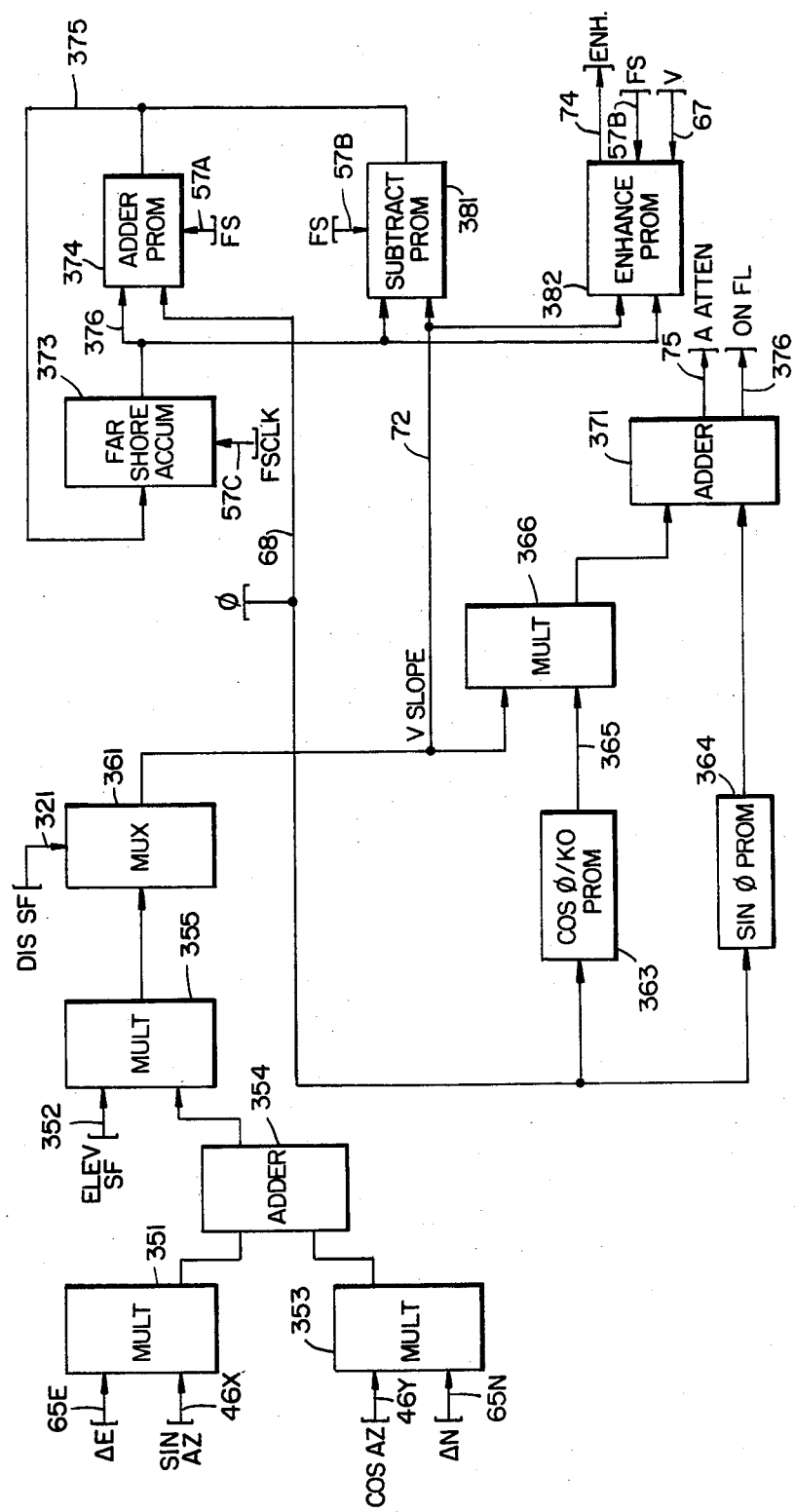
FIG. 16 shows, in schematic block diagram form, the details of terrain aspect unit 71 and far-shore enhancement unit 73 of FIG. 4.
Figure 17:
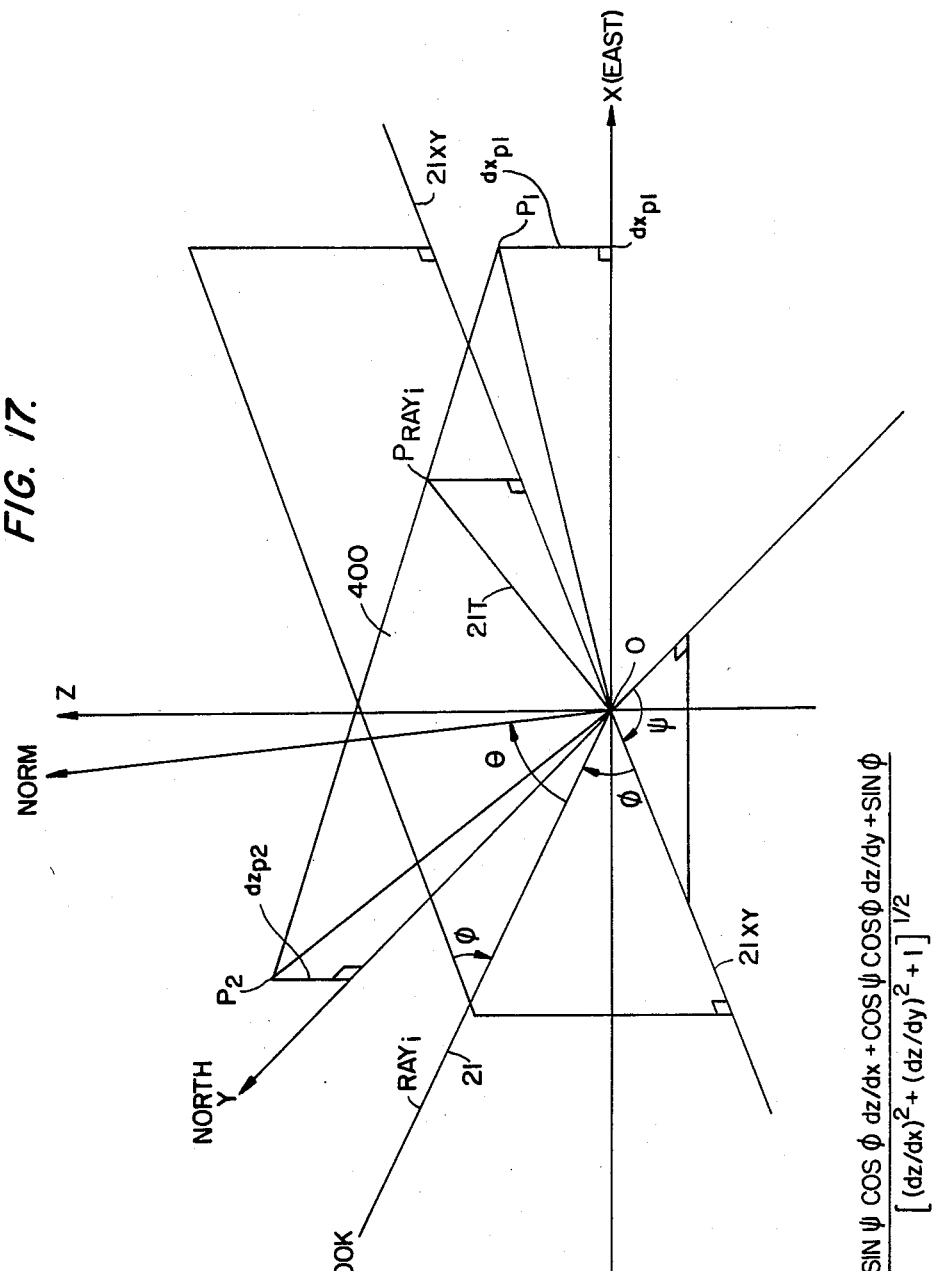
FIG. 17 is a three-coordinate axes illustration for explaining the operation of terrain aspect unit 71 of FIG. 14.

The details of terrain aspect unit 71 and far-shore enhancement calculation unit 73 are shown in FIG. 16 as comprising respective interconnected arithmetic signal processing circuits and look-up tables (PROMs) for carrying out prescribed trigonometric and data value accumulation functions shown diagrammatically in FIGS. 17 and 18, respectively.

More specifically, in FIG. 17 there is shown a three-dimensional, graphical illustration of a segment of terrain 400 upon which a ray (i) along a line 21 impinges at point 0, corresponding to the origin of a three-dimensional rectangular coordinate system (having coordinated axes X,Y and Z). Line 21XY represents the projection of ray (i) in the XY plane, the X axis corresponding to the easterly direction and the Y axis corresponding to the northerly direction, in accordance with the coordinate system in the terrain map stored in the scene memory, as described previously. The Z axis corresponds to the vertical dimension or the dimension in which elevation values for respective points in the XY plane are derived. Terrain segment 400 is shown as being defined by point P1 lying the XZ plane and point P2 lying in the ZY plane. Point P on ray (i) lies in the plane defined by the Z axis and line 21xy in the XY plane. The projection of ray (i) on the terrain surface 400 forms a line 21T. The normal to the terrain surface 400 at point 0 is represented by the line NORM, which forms an angle with the ray (i) line 21. As in the illustration of FIG. 17, ray (i) line 21 has a depression angle $\phi$ relative to level flight of the aircraft. The angle $\psi$ represents the azimuth of the projection of ray (i) line 21, namely, the line 21xy in the XY plane relative to the Y axis.

Given the above three-dimensional geometric characterization of terrain surface 400, the normal NORM can be defined as:

$$NORM = -(dz/dx)i - (dz/dy)j + k.$$

Thus, the effective look or boresight direction of ray (i) on surface 400, in accordance with the above geometrical graphical definition may be defined as boresight look direction $= -\sin\psi\cos\phi i - \cos\psi\cos\phi j + \sin\phi k$.

In computing the terrain aspect attenuation $A_T$ (from Lambert's Law), the following expression may be defined using the graphical illustration of FIG. 17

$$A_T = \cos\theta = \frac{\sin\psi\cos\phi \, dz/dx + \cos\psi\cos\phi \, dz/dy + \sin\phi}{\left(\left(\frac{dz}{dx}\right)^2 + \left(\frac{dz}{dy}\right)^2 + 1\right)^{\frac{1}{2}}}$$

wherein $\theta$ = the angle between the line of incidence 21 of ray (i) and the normal NORM to the terrain surface 400, $\psi$ = the ray azimuth angle;

$\phi$ = the depression angle; and $dz/dx$, $dz/dy$ = the slope in the east and northerly directions, respectively.

For calculating the terrain aspect attenuation value $A_T$, terrain aspect unit 71, details of which are shown in FIG. 16, is employed. Over lines 321 and 352, respective display scale factors and elevation scale factors, preestablished in accordance with the operating parameters of the display and the compression of the data in the scene memory, are applied as respective inputs to multiplier 361 and multiplexer 355. The delta elevation values from unit 53 and the azimuth values from the ray address unit 41 are coupled over links 65E, 65N and 46X, 46Y to each of multipliers 351 and 353. Multiplier 351 produces the product $dz/dx \cdot \sin\psi$, while multiplier 353 produces the product $dz/dy \cdot \cos\psi$. These two quantities are added in adder 354 the output of which is coupled as one input to multiplier 355. The output of multiplier 355 is coupled to multiplexer 361 whose output is coupled over link 72 corresponding to the scaled sum of the partial products of the effective slope values for surface 400.

The depression angle for the ray of interest is coupled over link 68 to a cosine $\phi$ PROM 363 and a sin $\phi$ PROM 364. The output of cosine $\phi$ PROM 363 is coupled over link 365 to a multiplier 366, the output of which is coupled to one input of an adder 371. The output of sin $\phi$ PROM 364 is coupled to the second input of adder 371. The output of adder 371 is coupled over link 75 corresponding to the above expression $A_T$.

The effective slope of terrain surface 400, coupled over link 72 from the output of multiplexer 361 and the depression angle $\phi$ are coupled to far-shore enhancement circuit 73 which produces an enhancement value on link 74 to be coupled to the return calculation unit 91 in the event that the ray of interest intersects a region of a far-shore. The effect is to require the brightening of the radar image in the vicinity of the far-shore region.

This is diagrammatically illustrated in FIG. 18 which shows the manner in which boundary rays 110 and 120 of a radar beam emitted from aircraft 11 are reflected at data points DP110 and DP120 off a water surface 200 and impinge a land area 210 at the intersection of reflected beams 120' and 110' at data points DP$_{120'}$ and DP$_{110'}$. Because of the far-shore region, there will be a brightening of the returns in the vicinity of the intersection of the surface of the water with the shore due to the reflections of the beam off the water. In other words, there is an effective accumulation of the return due to the reflections. This accumulation effect is carried out in the far-shore enhancement unit 73 by the incorporation of an accumulator 373 and associated look-up tables 374, 381 and 382.

More specifically, as shown in FIG. 16, the depression angle of the ray of interest is coupled over link 68 and applied as one input to an adder PROM or look-up table 374. The other input is applied over link 376 from the output of an accumulator 373. Accumulator 373 is incremented by a clock signal supplied over link 57C to produce a control code for accessing a prescribed value from PROM 374 which is coupled to counter 373 by way of link 375. If the ray of interest encounters water, the output of PROM 374 is added to the contents in accumulator 373. The value which is stored in PROM 374 is based upon the depression angle. When a far-shore region is encountered, subtraction PROM 381 effectively reduces the contents of the accumulator 373 in a manner similar to the augmenting of the contents of the accumulator 373 by adder PROM 374. The contents of the accumulator 373 are supplied to an enhancement PROM 382 which also receives on link 72 the value representative of the slope of the surface of the terrain encountered by the ray of interest. These two values are employed to access previously stored data indicative of the degree of enhancement. Simply put, PROM 382 contains enhancement codes which are selectively accessed depending upon the effective accumulated reflector and the slope of the terrain being encountered.

Input links 57B and 67 for enhancement PROM 382 are derived from range calculation circuit 63 and look-up table 54, to indicate whether or not the region of interest is a far-shore area and whether or not the data point on the terrain of interest being intersected by the ray is visible. These far-shore enhancement values are coupled over link 74 to return calculation unit 91. The enhancement code on link 74 is, in effect, a far-shore gain quantity by which the terrain aspect attenuation is modified. Namely, the final area attenuation for the data point of interest on the terrain may be expressed as $A_A = A_T{}^G F$.

Using the above obtained values from the terrain aspect unit 71 and far-shore enhancement unit 73, as well as the reflectance value from look-up table 54 and the V beam attenuation value from PROM 81, together with an equipment characteristic data input on link 93, return calculation unit 91 calculates the magnitude of the reflectance of the simulated radar return associated with the data point of interest. This is achieved in the return calculation unit 91 which effectively generates the product $P_r = K \cdot A_V \cdot F_A \cdot A_A \cdot V$, wherein K is an equipment parameter value coupled over link 93, $A_V$ is the vertical beam attenuation supplied over link 82 from vertical beam pattern unit 81, $F_A$ is the reflectance value supplied over link 56 from look-up table 54, $A_A$ is the area attenuation value supplied from terrain aspect unit 71 over link 75, and V is a single bit (0 or 1) indicating whether or not the data point of interest is visible or hidden. The product is supplied to a return calculation PROM 394 together with any far-shore enhancement codes supplied over link 74 from far-shore enhancement unit 73, to cause PROM 394 to supply a digital code over link 92 indicative of the intensity of the radar return for the data point of interest. In other words, the code on link 92 is, in effect, a brightness return code to be used to energize a pixel associated with the data point of interest in the cockpit CRT display. The location of the data point of interest is, of course, represented by the range code supplied on link 77 indicative of the location of the pixel along the particular ray of interest (i.e. the distance from the aircraft to the point on the terrain). These two values are supplied to the display processing unit 40 to be described below.

Before describing in detail the configuration and operation of the display memory control unit 40, it is useful to consider the pictorial shape of the radar beam return to be displayed to the pilot/observer in terms of such a presentation in a conventional/analog sense. Namely, in accordance with the present invention, what is presented to the pilot/observer on the face of the radar display device is a digitally generated simulation of what appears to be a radar beam return from analog equipment. As a normal radar beam has an areal cross-section, namely both a vertical dimension and a horizontal dimension, these characteristics must be recreated and processed to achieve an accurate recreation of the radar beam return on the cockpit display. The vertical portion of the beam, namely the effective spread of the beam in the vertical dimension about the boresight of the beam which subtends some depression angle from the flight of the aircraft, as discussed above, is taken into account in the predisplay radar return processing electronics. The horizontal spread of the beam, however, is processed by way of the display control unit, to be described herein after.

Figure 20:
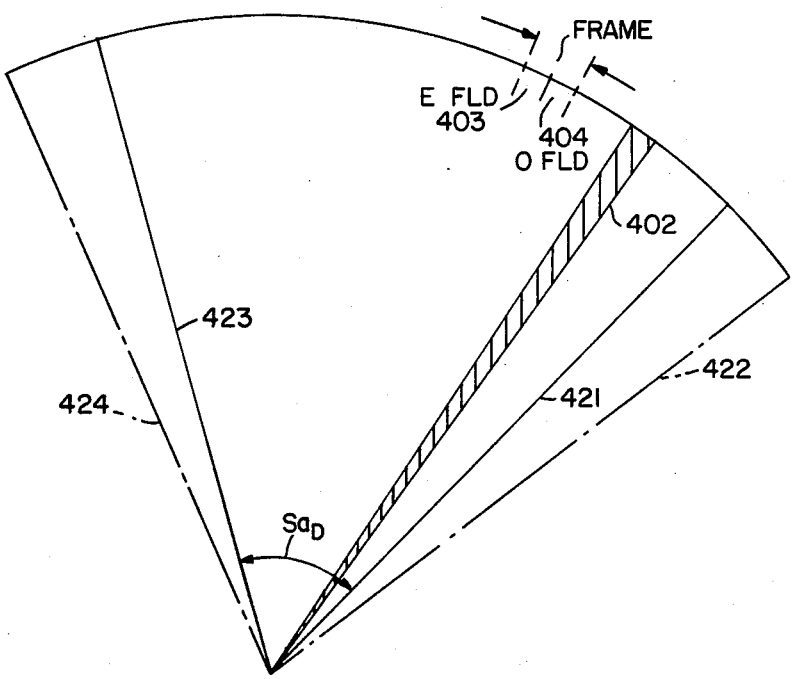
FIG. 20 is a diagram of a radar beam sweep pattern.

Referring now to FIG. 20, there is shown an illustration of a CRT-generated display image to be presented to the pilot/observer in terms of the radar beam return image 415 as it is swept over the scan angle $S_{aD}$ between clockwise-most edge 421 and counterclockwise-most edge 423. The illustration of FIG. 20 is for a radar beam scanning field angle of 60°.

Adjacent to clockwise-most edge 421 is an additional radial boundary line 422 and adjacent to counterclockwise-most edge 423 is an additional radial boundary line 424. Boundary line 422 is separated from edge 421 by a prescribed angle $BS_R$, while boundary line 424 is separated from edge 423 by a prescribed angle $BS_L$. As will be described below in conjunction with the descritpion of FIG. 23, these additional wedge or thin pie slices defined by angles $BS_R$ and $BS_L$ are employed to provide prescribed edge boundary ray packet data for the beam as its centerline sweeps back and forth over sweep angle $S_{aD}$ between edges 421 and 423.

Figure 21:
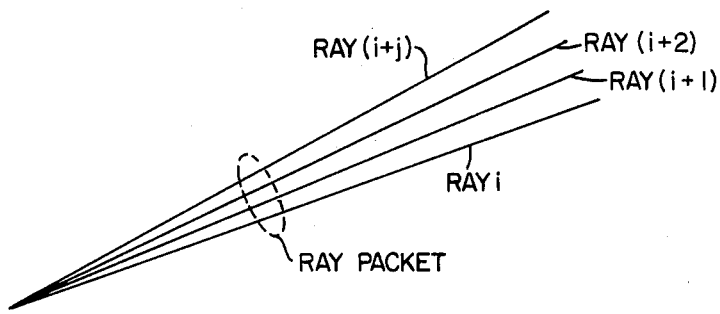
FIG. 21 shows a ray packet portion of a radar beam sweep pattern.

In the above description of the radar return processing electronics of FIGS. 1–19, the addressing of the contents of the scene memory and the calculation of the radar return based upon navigational inputs and geometrical relationships of the aircraft relative to the terrain has been explained as being effected on a ray-by-ray basis, proceeding along the individual data points for the respective rays. Since the radar beam itself has some prescribed horizontal dimension, it is effectively made-up of a plurality of such rays. Moreover, as described previously, since the scene memory is scanned along successive rays forming a plurality of ray packets, so as to effectively guarantee that every data point in the scene memory is accessed so that there are no gaps or blank spaces in the radar return signal, the displayed beam 415 may be considered to be made up of a plurality of such ray packets, an individual one of which is shown in FIG. 21. Namely, as pointed out previously, each ray packet may be comprised of a set or group of adjacent rays, the respective data points along which are staggered or offset from one another, based upon the number of rays in the packet. In the embodiment described herein, where a ray packet is considered to be made up of four adjacent rays, the offset of data points relative to the location of the aircraft or pilot/observer is one-fourth of the displacement between adjacent points on an individual ray, as described in detail above in conjunction with the description of FIG. 3. In accordance with the present invention, for defining the characteristics of the radar beam to be displayed to the pilot/observer, a plurality of adjacent data packets are processed (selectively weighted) as a group.

Figure 22:
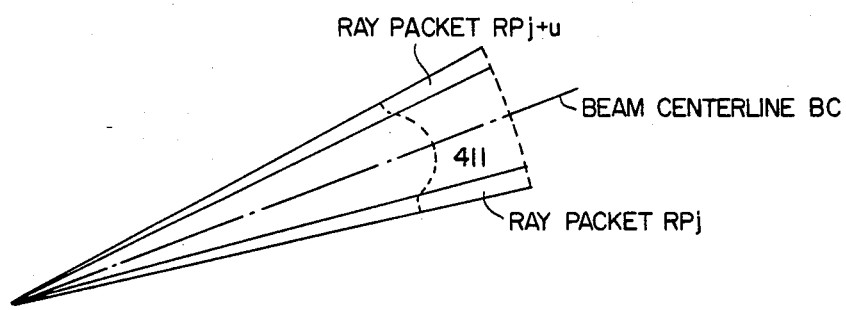
FIG. 22 shows a radar beam profile of a plurality of adjacent ray packets.

This is illustrated in FIG. 22 wherein plural ray packets $RP_j \ldots RP_{j+k}$, adjacent to one another, are shown as contributing to the energy profile of a radar beam, such as beam 415 shown in FIG. 20, the center line BC of which is coincident with the highest weighting of a prescribed weighting function, graphically shown at 411. The weighting function may typically be Gaussian, with those ray packets at the outer edge of the beam contributing a lesser amount than the ray packet along the center line BC.

The number of ray packets that are employed to define the characteristics of the beam will depend upon prescribed control parameters. These parameters include the field of sweep or the sweep angle, the rate of sweep of the beam back and forth through this sweep angle, and basic system timing in accordance with which the radar display image is generated. Using present day commercially available CRT raster scan apparatus, a frame of video signal processing (comprised of an odd field and an even field) operates over a time interval of one-thirtieth of a second. The number of ray packets that are processed to define an individual beam will depend upon the time interval within which the processing electronics may operate, consistent with the strobbing of the odd and even fields of the TV raster scan and the rate of sweep of the beam 415 across the field of sweep which is chosen to effectively simulate that of a conventional analog radar sweep. In practical terms, over a 120° scan angle, for a 1.5 second scan interval during which the beam traverses the field of view, the field may be subdivided into time intervals of approximately 90 fields or 45 frames during which radar beam data may be processed. In terms of the resolution of the scene memory, this means that each beam may be considered to consist of approximately 5 ray packets (in the present example of four rays per packet). The term approximate is used here since mathematically it turns out that during the odd and even field processing times of successive frames covering the sweep of the beam across the sweep angle, a subdivision of that time interval into the processing time for successive rays, and thereby ray packets of which individual beams are comprised, cannot be equally subdivided. Accordingly, successively processed beams may be comprised of some integral number of ray packets approximating five packets, but comprising an integral number of such packets for each successive beam. In other words, each beam is considered to comprise an integral number of ray packets, the number of which for successive frames may change, in order to insure conformity or a fit within the video frame processing time as governed by the CRT raster scan. A full understanding of this process will be obtained from the description of the components and operation of the display processing electronics to be described below.

Figure 23:
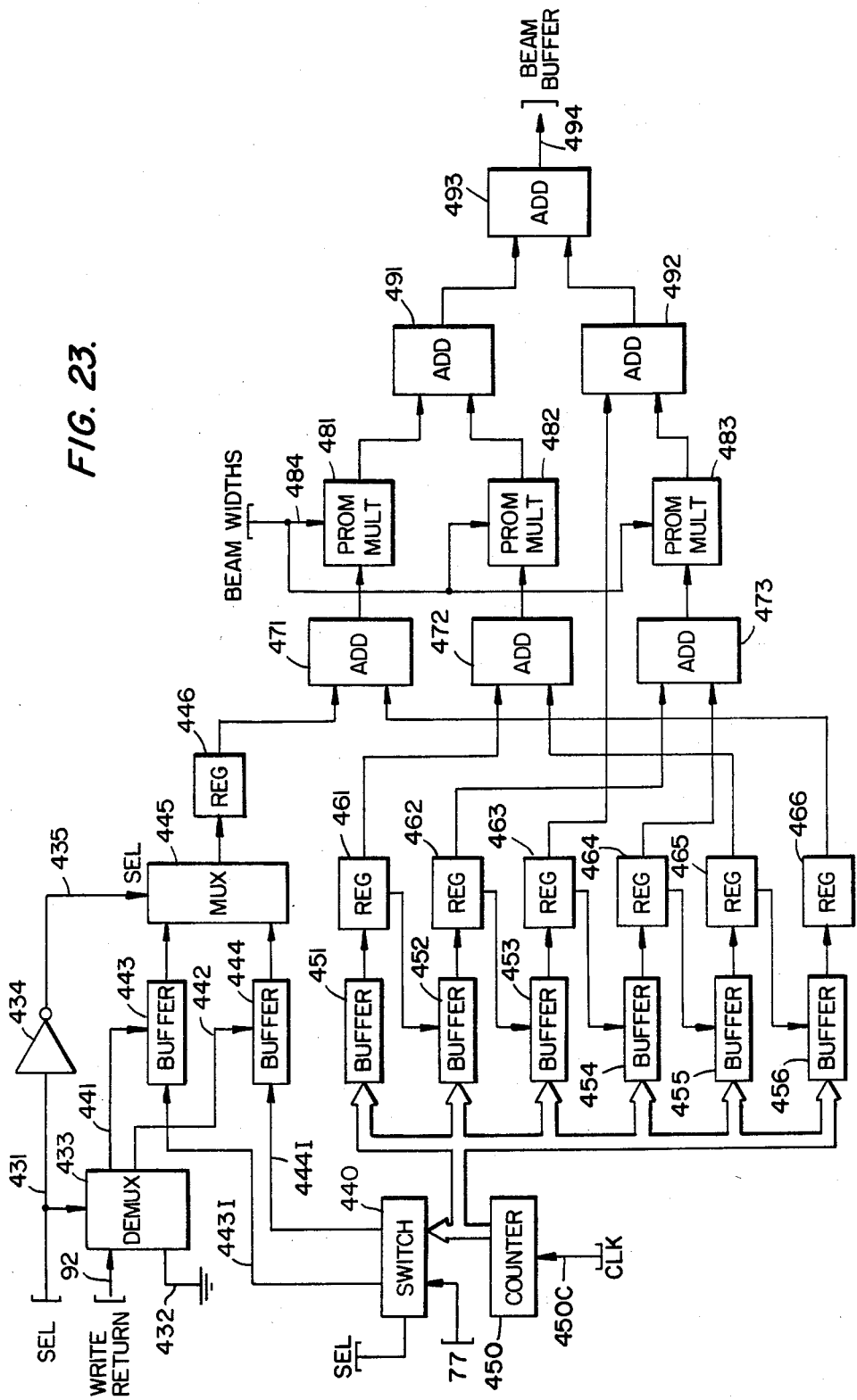
FIG. 23 is a block diagram of a radar return processing/weighting unit.

Referring now to FIG. 23, a block diagram of the horizontal beam width processing unit, through which the characteristics of an individual return beam, intensity values along respective data points of which are to be mapped into display memory for presentation to the pilot's/observer's cockpit display, is shown. The radar return intensity values derived from the radar calculation unit 91 described above are coupled over link 92 to one input of a demultiplexer 433. A second input of multiplexer 433 is coupled over link 432 to a reference potential (e.g. ground or zero). Range values, corresponding to respective distances from the pilot/observer or aircraft origin at 11 to points along the individual rays, by way of which the contents of the scene memory are addressed and the eventual radar return data point addresses are produced, are coupled over link 77 via a switch 440 as address inputs to a plurality of buffers 443, 444 and 455–456. Switch 440 is controlled by select (SEL) line 451 to couple the contents of counter 450 to one of links 443I and 444I and the contents of link 77 to the other of links 443I and 444I. Counter 450 is incremented by a clock signal on line 450C to generate successive codes for stepping through the addresses of the buffers.

Each of the buffers has a capacity sufficient to contain the number of data points of which an individual ray is comprised. Thus, for example, where each ray is comprised of 960 data points ($DP_0 \ldots DP_{959}$), each buffer may be comprised of a 1K RAM, with a data resolution of 8 bits or simply an 8×1024 RAM. The respective memory locations of each buffer are addressed in accordance with the range value of the data point on link 77, whose reflectance return value is supplied over link 92. Thus, at the data point whose distance from the aircraft is closest to the aircraft, the return value will be stored at the lowermost address value of a respective 8×1024 RAM and successive data values will be loaded in those memory cell locations whose range values correspond to the addresses of successive cells of the buffer. Thus, as the successive data points $DP_0$, $DP$, $DP_i \ldots DP_{i+1} \ldots DP_{959}$ of an individual ray are processed, the return values for those data points are successively loaded in successive memory locations 0 . . . memory location 959) over respective buffer.

Each of buffers 443 and 444 is coupled to remaining buffers 451–456 through successive latches 446 and 461–466 to form a stack through which successive ray packets of which an individual beam is comprised are serially routed during the processing of successive adjacent beams in the manner to be described below.

More particularly, as point out above, demultiplexer 433 has two inputs, one of which is coupled to the data return values supplied over link 92 and the other which is coupled a reference potential over link 432. Demultiplexer 433 is controlled by a timing signal on link 431, which switches outputs 441 and 442 between input links 92 and 432 in a flip-flop fashion for successive signals on link 431. The output of link 431 is coupled through inverter 434 over link 435 to the control input of multiplexer 445. Multiplexer 445 selectively couples the contents of one of buffers 443 and 444 to a latch 446. The contents of each of the remaining buffers 451 . . . 456 is coupled to an associated latch circuit 461 and 466. Each of latch circuits 446 and 461–466 is coupled to beam width weighting circuitry comprised of adders 471, 472 and 473, coefficient multipliers 481, 482 and 483 and adders 491–493.

More specifically, adder 471 sums the contents of latch circuits 446 and 466, adder 472 sums the contents of latch circuits 461 and 465, and adder 473 sums the contents of latch circuits 462 and 464. The contents of latch circuit 463 are coupled directly to one put of a downstream adder 492. The output of adder 471 is coupled to PROM multiplier 481, the output of which is coupled to an input of adder 491. The output of adder 472 is coupled to a PROM multiplier 482, the output of which is coupled to an input of adder 491. The output of adder 473 is coupled to a PROM multiplier 483, the output of which is coupled to an input of adder 492. The outputs of each of adders 491 and 492 are summed in adder 493, the output of which represents the effective characteristics of a respective radar return beam based upon the weighting of a plurality of adjacent data packets a central one of which is effectively aligned with the boresight axis or centerline of the beam.

Considering now the operation of the horizontal beam width processing unit of FIG. 23, as successive data values for an individual ray supplied over link 92 are applied to demultiplexer 433, they are coupled into one of buffers 443 and 444. Namely, buffers 443 and 444 are ping-ponged with respect to one another in a write-read fashion. Thus, as data is being written into one of buffers 443, it is read out of the other buffer 444 through multiplexer 445 and stored in latch 446. At the same time, the contents of the read out storage cell are loaded with blank data (all zeros). The reason for this loading is due to the fact that the address values for an individual ray of one of the four rays of a data packet may not necessarily access each of the addresses within the buffer. Namely, as pointed out previously, packets, groups or sets of rays are employed to insure that the resolution of the scene memory is attained during the scanning of the data points in the scene memory.

Figure 24:
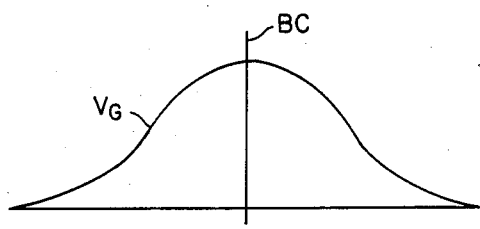
FIG. 24 is a characteristic profile of the weighting of adjacent ray packets within a radar beam by the radar return processing/weighting unit of FIG. 23.

Assuming now, for example, that radar return values coupled over link 92 are applied through demultiplexer 433 to link 441 and successively loaded into buffer 443, then, at the same time, previously stored data values which have been loaded into buffer 444 are coupled through demultiplexer 445 and stored in latch circuit 446. Each latch circuit 446, 461–466 is a single byte (8bits) latch and its contents are coupled to the successive address locations of the next succeeding buffer. Thus, as a new data value is coupled through multiplexer 445 from one of buffers 443, 444, it is temporarily stored in latch circuit 446 and then applied to the address designated by link 77 in the next successive buffer, here buffer 451. Thus, for the radar return value of the first data point of interest supplied over link 92 which is closest to the pilot/observer or aircraft, the return value will be loaded into the lowest address location of buffer 443. At the same time, the previous contents of the corresponding memory location in buffer 444 are coupled through multiplexer 445 and supplied to latch 446. As this eight bit value is read out of the address location in buffer 444, blank data or all zeros, as governed by the state of link 442 through demultiplexer 433, is coupled then to the corresponding address in buffer 444. Thus, for a 960 data point excursion along an individual ray, as successive rays of a ray packet are processed, the data values are loaded into successively addressed storage locations in buffer 443. Once that ray packet has been processed, multiplexer 445 switches its inputs to read out the contents of the just written-into buffer (here buffer 443) while beginning a loading of the previously zeroed-out buffer (here buffer 444). During the read-out of the successive contents of the individual buffers, each memory cell is temporarily latched in the associated latch (latches 446, 461–466), as pointed out above, and then written into the corresponding address in the next downstream buffer. Thus, the contents of the associated memory locations of buffer 451 are written into the corresponding memory locations of buffer 452, while the contents of buffer 452 are read out via latch 462 and written into the associated memory locations in buffer 453, as so on. For each associated data value, associated with an address defined on link 77, the contents of latches 446, 461–466 are coupled to the beam weighting circuitry, so that the weighting function established by the contents of multipliers 481, 482 and 483 and the associated arithmetic circuits, namely adders 471–493, operates to provide an effective weighting of the resultant beam on link 494. An example of such weighting is illustrated in FIG. 24 wherein an effective Gaussian weighting function $K_G$ is shown. As illustrated therein, the maximum weighting value lies along the centerline of the beam, namely, the data packet lying along the centerline (here, for seven adjacent data packets, the data packet stored in buffer 453).

As explained above, the horizontal beam width processing unit of FIG. 23 processes successive ray packets lying within a prescribed sweep angle of the radar beam, to provide successive centerline beam values over link 494. Namely, the beam values supplied over link 494 correspond to the sweep of the beam over sweep angle $Sa_D$ between sweep angle boundary edges 421 and 423, as shown in FIG. 20, referenced above. Since, however each beam is comprised of a plurality of ray packets lying on either side of the beam centerline, as depicted in FIG. 22, additional ray packet information is required in the vicinity of the boundary edges 421 and 423, where the beam begins to spill over outside the boundary edges. Compensation for this spill over is provided by supplying auxiliary address and data values corresponding to prescribed ray packets that lie outside the boundaries 421 and 423 of sweep angle $Sa_D$, within radial segments BSR and BSL, shown in FIG. 20, referenced above. As will be readily appreciated from the foregoing description, for a beam comprised of seven ray packets, and four rays per packet (i.e. twenty-eight rays per beam) each of segments $BS_R$ and $BS_L$ will accomodate fourteen rays.

Figures 25, 26:
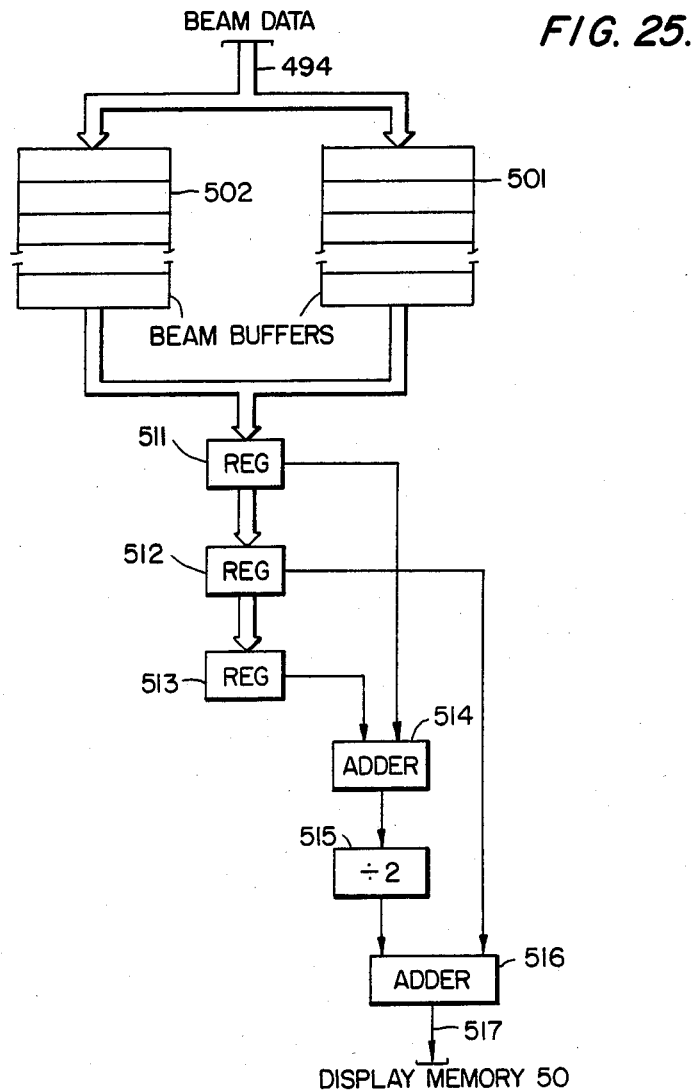
FIG. 25 is a schematic block diagram of a beam buffer/compression unit.
FIGS. 26 and 28 show pulse shape weighting profiles for successive radar return values stored in the beam buffers of FIG. 25.

The weighted beam values supplied over link 494 are coupled to respective sets of beam buffers 501 and 502 in the beam buffer compression unit of FIG. 25. Each of buffers 501 and 502 is comprised of a set of registers, each of which has a capacity corresponding to the capacity of the ray packet buffers in FIG. 23. Namely, as each of the successive return values are processed in accordance with the beam weighting algorithm to generate the 960 successive return values for an individual beam, those resulting values are loaded into the successive storage locations of respective ones of the registers of beam buffers 501 or 502. The number of registers of which beam buffers 501 and 502 are individually comprised is sufficient to encompass the processing time of one frame of the CRT raster scan of the pilot's display. As pointed out previously, for the parameters of the present system, this means that up to seven beams per odd field and seven beams per even field may be processed. Thus, a total of 14 beam registers per buffer are required. In terms of present day commercially available semiconductor components, this means that a pair of 8K×8 RAM chips may be employed to provide the odd and even field memory capacity required.

As will be explained below, during the writing of data into the display memory and the reading of data from the display memory for application to the CRT display, one of beam buffers 501/502 is being loaded with data from the beam processing electronics, while the other beam buffer 502/501 is being read out for application to the display memory. In terms of the parameters of the equipment being employed, the display memory is comprised of a 480×480 pixel memory, the contents of which are successively read out in association with the odd and even fields of the TV raster scan for generation of the radar display.

Prior to application to the display memory, the successive data values of which an individual beam is comprised are subjected to a pulse weighting algorithm, corresponding with the type of radar pulse the equipment is designed to simulate. This may comprise trapezoidal weighting wherein a central data value is flanked by proportionally decreasing amplitude return values for the pulse return of interest.

More specifically, FIG. 26 shows the manner in which the contents of successive addresses 0 ... 959 of a beam buffer register are combined with one another to produce a reduced number of 480 weighted return values. The beam intensity values for groups of three adjacent memory cells are selectively combined with one another by taking the central one of the group of three and adding it to the average of the data values for the two memory cells flanking the central one of the group. Thus, as shown in FIG. 26, for the first three memory cells 0, 1 and 2, the data value of memory cell number 1 is added to the average (or the sum divided by 2) of memory cells 0 and 2. This resulting quantity is then applied for the lowermost address or data location on that particular beam as the actual data value to be stored in the display memory. In the algorithm illustration of FIG. 26 it can be seen that the combining of the contents of memory cells in groups of threes is staggered to produce the effective compression from 960 to 480 data values of which a beam of interest is comprised.

Circuitry for carrying out this operation is shown in FIG. 25, referenced above, wherein the contents of a respective register of beam buffer 501 are applied successively through pipelined registers 511, 512 and 513. Namely, beginning with memory cell number 0 and ending with memory cell 959, the contents of an individual beam register within buffer 501 or 502 are coupled through pipelined registers 511–513. The contents of registers 511 and 513 are added in adder 514 and the result is divided-by-two, represented by divider 515. In the actual digital logic implementation, the divide-by-two function may be accomplished simply by performing a least significant bit-directional shift of one bit. The output of divider function 515 is then added in adder 516 with contents of register 512, the output of which is supplied over link 517 as an eight bit code corresponding to the effective combination of the three memory cells of interest. Using this algorithm processing circuitry, and with the weighting sequence function shown in FIG. 26, after memory cells 0, 1 and 2 are processed to produce a compressed weighted value on link 517, the contents of the beam register of interest are piped through registers 511–513 as the first two memory cell contents 0 and 1 are dumped, so that the contents of memory cell number 2 resides in register 513, the contents of memory cell number 3 resides in register 512 and the contents of memory cell 4 resides in register 511. The trapezoidal weighting function algorithm is then again performed by the adder and divider circuitry to produce a new weighted value on link 517 corresponding to the second group in the sequence. This process is repeated for the succeeding contents of memory cells 4, 5, 6, . . . 957, 958 and 959, so that there are obtained 480 successive weighted return codes to be coupled to the display memory.

As described above, as the contents of individual buffer registers of the beam buffer unit 501 or 502 are processed in accordance with the radar pulse weighting algorithm, such as the trapezoidal weighting function illustrated in FIG. 26, what is effectively produced is a compression of new beam values for the respective beams of interest as they are read out of the individual buffer registers. In the course of the generation of the original beam values from the ray packets, there was effectively created a compression of the data points derived from the scene memory to return values on a set of beam lines, now currently stored in the respective beam registers of buffer units 501 and 502. Because of this effective compression, the storage of such beam values along the successive beam radial lines of the radar beam sweep in the display memory may not necessarily be sufficient to address every pixel location in the display memory and thereby store a data value at each pixel location. This is particularly true where the aircraft is undergoing a change in direction so that the radial lines of the radar pattern, corresponding to the effective beam sweep from the aircraft, are undergoing a change of direction.

Figures 27, 28:
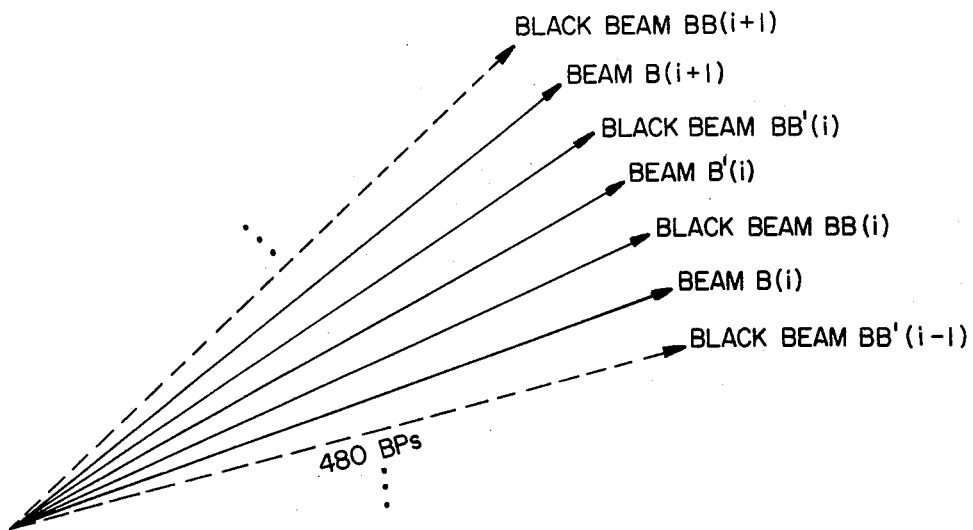
FIG. 27 shows the distribution of a plurality of adjacent beams as interpolated from the contents of the beam buffers of FIG. 25.

To obviate this potential problem, a beam fill-in process, similar to the ray fill-in technique for addressing the scene memory, is employed for addressing and storing beam values in the display memory. How this is effectively achieved is illustrated in FIG. 27 which shows a pair of beams B(i) and B(i+1) corresponding to successive beams the data values of which are read out of one of buffer registers 501/502 and subjected to the pulse weighting algorithm of the read out compression circuitry discussed in conjunction with the description of FIGS. 25 and 26. As shown in FIG. 27, for beam B(i) there are three associated beams offset therefrom and evenly spaced between the angular displacement of beam B(i) and beam B(i+1). The first beam being adjacent B(i) is a black beam BB(i). This beam corresponds to the storage of a black (all zeros) level for each of the beam points lying along line BB(i). A similar beam BB'(i) is shown adjacent beam B(i+1). The beam intermediate beams BB(i) and B(i+1), identified as beam B'(i) is generated by applying the beam data values for beam B(i) stored in the buffer register of interest to the radar pulse compression circuitry, but with an offset of one data point position. This is illustrated in FIG. 28 wherein, from a comparison with FIG. 26, it can be seen that the same radar pulse processing algorithm discussed above is employed except that it is offset by one beam data point. The generation of the values for beam B'(i) are achieved by reading out the same contents of the buffer register of interest containing the data values for beam B(i) and applying the values successively to pipelined registers 511 and 512 and 513 except that, during the initial loading of the registers, the data value for the zero data position is piped through and dumped from register 513, so that register 513 stores the data value for beam point 1, register 512 stores the data value for beam point 2 and register 511 stores the data value for beam point 3. The pulse compression algorithm produces a value centered about beam data point 2 summed with a reduced proportional value for beam data points 1 and 3 and the resultant value supplied to display memory 50 for the initial address point along beam B'(i). Subsequent beam points for beam B'(i) are processed in the same manner discussed above for beam B(i) except for the offset shown in FIG. 28.

Figure 29:
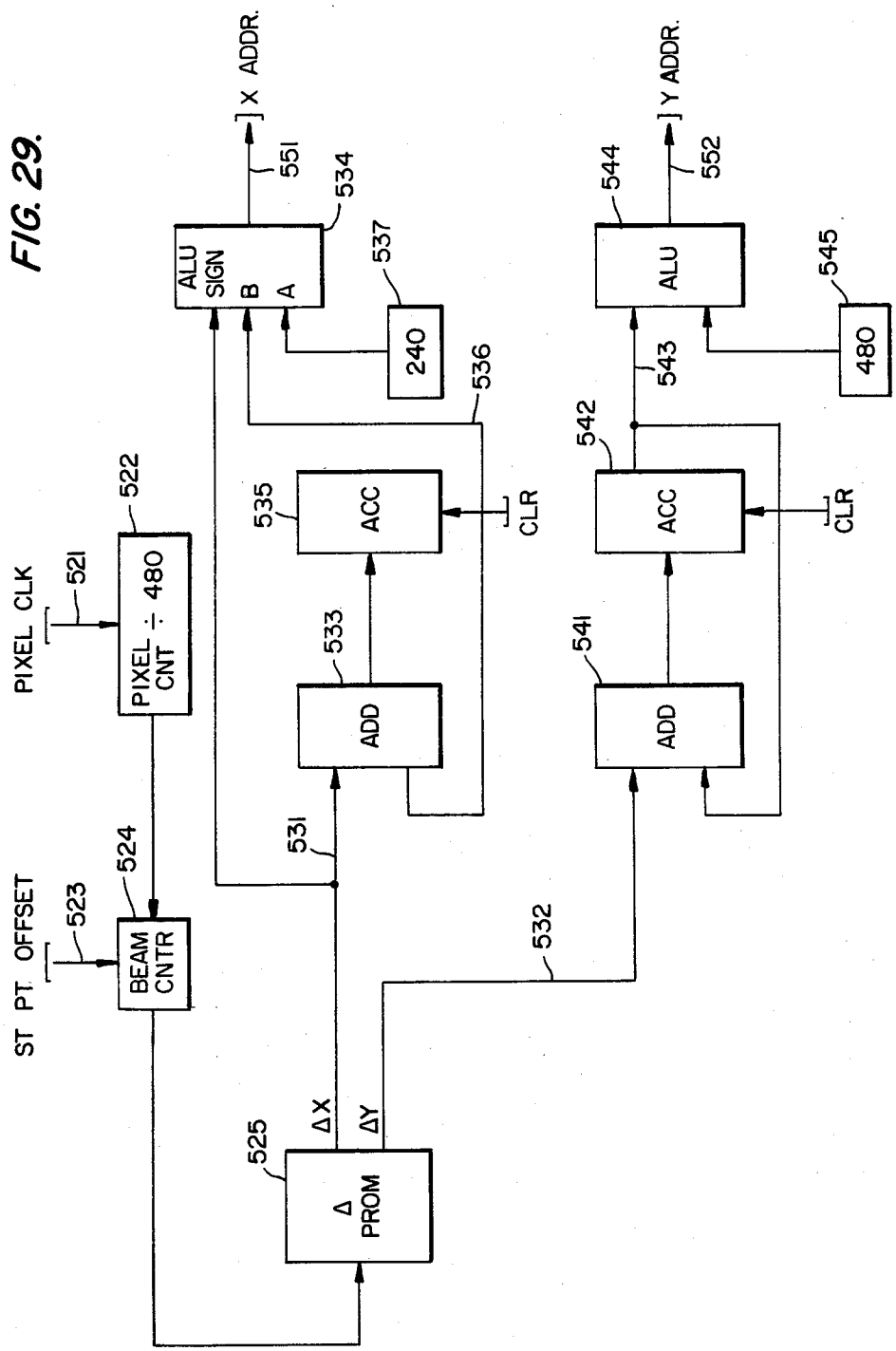
FIG. 29 is a schematic block diagram of a beam address generator for accessing the display memory 50 of FIG. 1.

The generation of address values for storing the compressed beam point values for each of the 480 points along each of the beams, including the filled-in black beams and offset beams as shown in FIG. 27, is carried out by the address generation circuitry of FIG. 29. For addressing the successive points along a respective one of the beams and thereby defining addresses lying along that beam which map into the display memory, the starting point of the beam and the effective angle of the beam relative to the heading up position of the radar display are initially established by a beam counter 524 and a beam angle PROM 525. For accessing each beam point, a pixel clock supplied over line 521 to a pixel counter 522 and to adders 533 and 541 is supplied from the system master timing circuitry. Every 480 pixel clocks, namely for the number of beam data points of which an individual beam is comprised, counter 522 supplies an output to beam counter 524. Beam counter 524 is supplied initially with the angular orientation (relative to heading-up) of the starting beam in the sweep (the clockwise-most beam, for example, which value is converted by angle PROM 525 into incremental X and Y values on links 531 and 532. The incremental X value on link 531 is summed in adder 533 with the contents of an accumulator 535. In effect, adder 533 and accumulator 535 provide sequential incremental X values or the total distance between the location of the aircraft and the point of interest on the beam of interest in terms of the X axis (or horizontal axis for a vertical or Y-heading-up coordinate system orientation).

Figure 30:
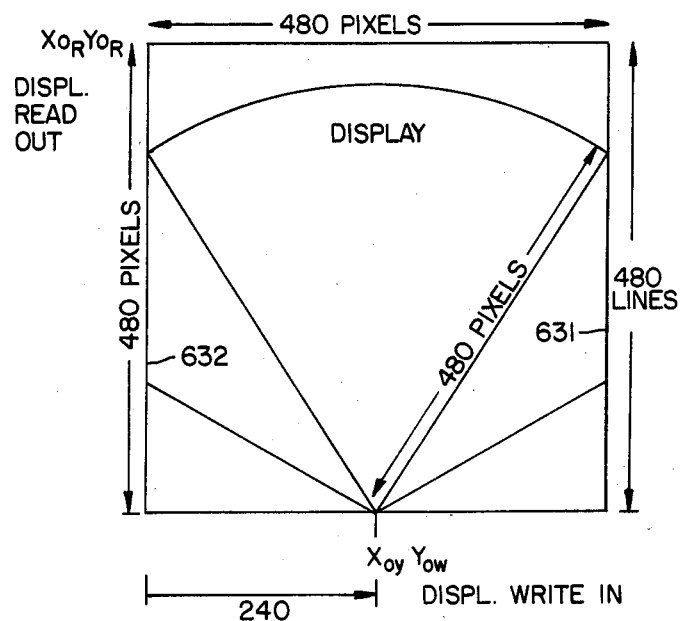
FIG. 30 is a graphical illustration of the radar beam pattern coverage stored-in and read-out from display memory 50.

Similarly, the Y values are supplied over link 532 to an adder 541, the output of which is coupled to an accumulator 542. The output of accumulator 542, like the output of accumulator 535, is coupled back over link 543 to a second input of adder 541. Thus, accumulator 542 keeps a running total of the displacement in the Y or heading-up, vertical direction of a beam data point of interest on the beam of interest relative to the heading of the aircraft. These accumulated values are supplied as one input of respective arithmetic logic units 534 and 544. A second input of each of these unit is supplied from a respective register representative of the location of the starting point of the radar beam sweep in terms of the coordinate system of the display memory. This coordinate system orientation is shown in FIG. 30 which illustrates the starting point $(X_0, Y_0)$ as being offset from the upper left hand corner of the display memory by 480 pixel or memory address units in the negative Y direction and 240 pixel or memory units in the positive X direction. Thus, relative to the upper left hand corner of the display memory, whereat the read out scan is begun for application to the TV raster of the display CRT, ALU 534 subtracts the value in register 545 (here 480 beam point pixel units) from the value supplied over link 543 and supplies a Y address value over link 552 via applied to an address a particular pixel in the display memory.

Similarly, ALU 534 adds the value (240) stored in register 537 to the contents of accumulator 535. The sign of the value on the link 531 is coupled as a third input to ALU 534 to indicate whether the generated address on link 531 is in the right half portion or left half portion of the display. For a positive sign on link 531, the $\Delta X$ value on link 531 is added to the value of register 537 to produce the address on link 551. For a negative sign on link 531, the $\Delta X$ value on link 531 is subtracted from the contents of register 537 to produce the address on link 551. The resulting X address is supplied over link 551 to the display memory control circuitry shown in FIG. 31.

Figure 31:
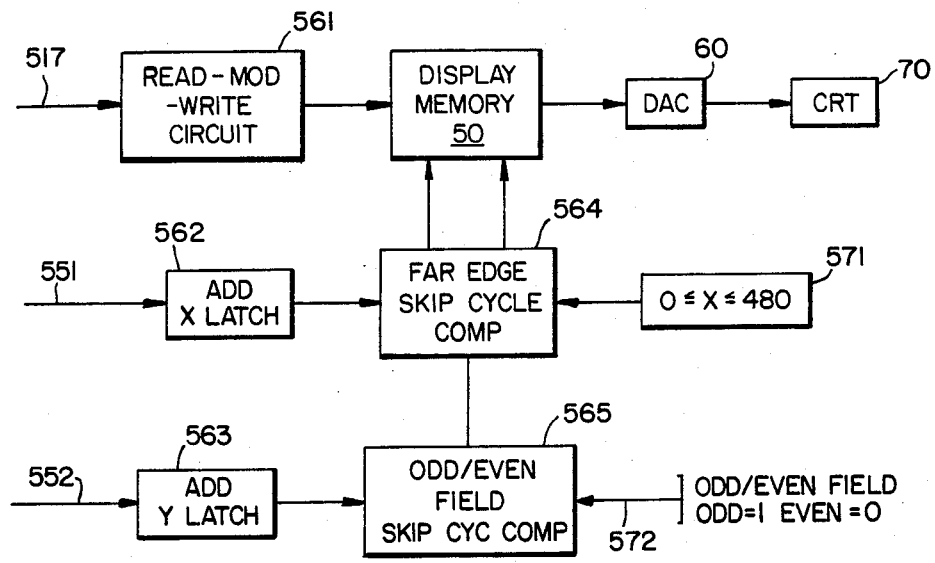
FIG. 31 is a schematic block diagram of display memory address coupling circuitry.

Referring now to FIG. 31, each of the X and Y address signals from the display memory address circuitry shown in FIG. 29, described above, is applied to a respective X address register 562 and a Y address register 563. The contents of X address register 562 are compared in a far edge skip cycle comparator 564 with a boundary code supplied from a boundary code storage unit 571. Boundary code storage unit 571 supplies a code corresponding to the addressable capacity (in the X direction) of the display memory 50. Namely, with attention again directed to FIG. 30, as pointed out above, the display memory has some finite capacity (here a 480 pixel × 480 pixel storage capacity). If the X address supplied over link 551 falls to the right of boundary 631 or to the left of boundary 632, as shown in FIG. 30, then it is determined that the address of interest lies outside the storage capacity of the memory and should not be generated. In this instance, comparator 564 will prevent the contents of register 562 from being coupled to display memory 50.

Similarly, the Y address values applied over link 552 and latched in register 563 is compared in an odd/even field skip cycle comparator 565. Comparator 565 compares the least significant bit of the address of interest with a bit supplied over link 572 from the master timing circuitry of the raster scan indicative of whether or not the Y component of the address for the pixel of interest in which data is to be stored falls in the field which is currently being read out from display memory for display.

Figure 32:
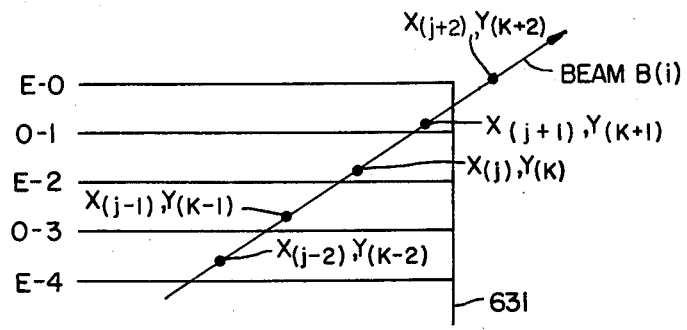
FIG. 32 is a partial odd/even field display memory scan diagram for explaining the operation of the circuitry of FIG. 31.

The functions carried out by comparators 564 and 565 are illustrated in FIG. 32 which shows a plurality of successive beam data points $X_{(j-2)}, Y_{(k-2)} \ldots X_{(j+2)}, Y_{(k+2)}$ falling on a beam $B_i$. For the data point $X_j, Y_k$, for example, the integer value for the X portion of the address would fall within the capacity of the display memory so that comparator 564 would permit the X address to be coupled to display memory 50. The Y portion of the address corresponds to a pixel lying in the even field (here the second row of pixels in the display memory, as referenced from the top of the display). If, at the time the generation of this address, the even field within the display memory 50 were being addressed for read out and presentation to the CRT display, comparator 565 would inhibit the Y address portion in latch 563 from being supplied to the display memory 50, so that the pixel value for the point of interest could not be stored at that address.

Similarly, for address location $X_{j+2}, Y_{k+2}$, it can be seen that the X address portion of the address falls beyond the right-most boundary of the matrix of memory addresses for pixel storage of the display memory. Thus, comparator 564 would inhibit the coupling of the contents of register 562 to the display memory so that no data value for that point of interest would be coupled to the display memory 50.

Since the time interval within which the contents of the beam registers within beam buffers 501 and 502 are to be processed in terms of both the odd and even fields of the display memory is sufficient to permit the generation of each of the additional beams, namely the offset beam and the fill-in black beams, as well as sufficient to permit addressing display memory 50 for both the odd and even fields, within the normal TV raster scanning cycle, it is guaranteed that every pixel within display memory 50 will be addressed and loaded with the correct return value for the radar sweep being simulated. Namely, if, during an odd cycle, an attempt is made to write data for an even line in the display memory 50, such as with reference to the above $Y_k$ value for even line number 2, which attempt would be inhibited by comparator 565, then during the next subsequent field (or even cycle), when that particular address is generated, when the even field is being read out, comparator 565 would permit the odd field data to be stored in display memory 50 for subsequent read out during the next following even field scan. Simply put, odd field data is written into display memory 50 during an even field read, which read-out field is coupled through DAC 60 to CRT display 70. Even field data is written into display memory 50 during odd field read-out, which odd field data is coupled through DAC 60 to CRT display 70.

Figure 33:
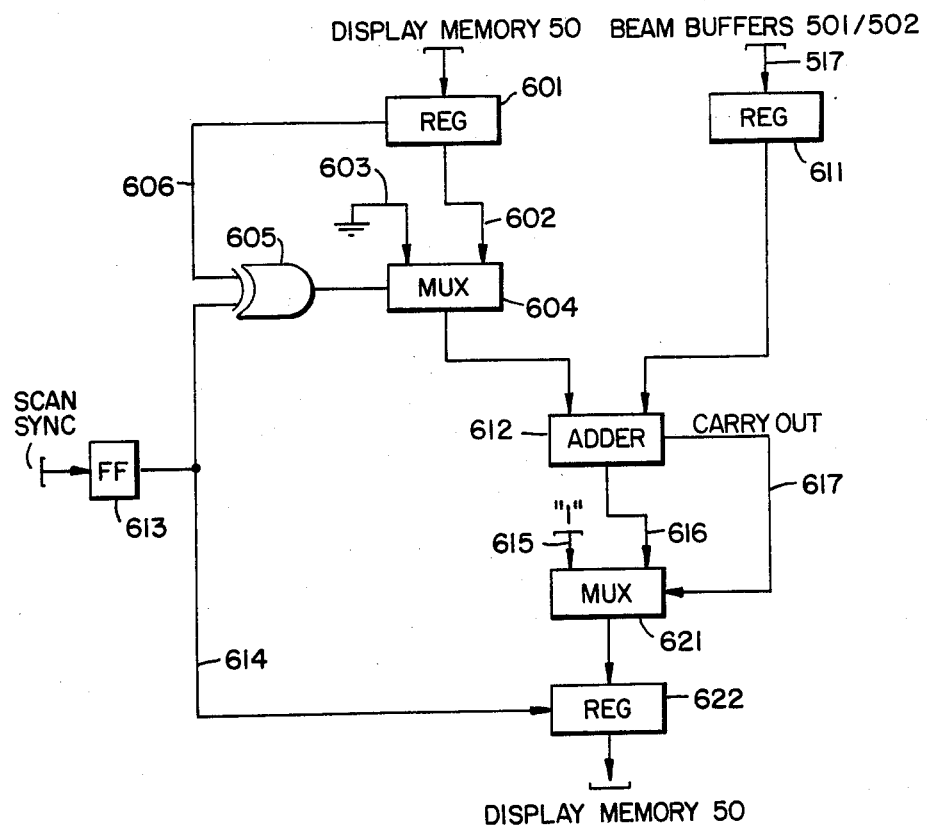
FIG. 33 shows the details of read-modify-write circuit 561 of FIG. 31.

For application to the display memory 50, the data itself, which is coupled over link 517 from the beam buffer processing circuitry, discussed above in conjunction with the description of FIG. 25, is coupled to a read-modify-write circuitry 561, the details of which are shown in FIG. 33. This circuit is employed to provide an additional modification of the pixel intensity values along the respective beam data points to provide an accurate simulation of the radar beam in terms of what would normally be expected to be seen from an analog return.

More specifically, for analog transmit-receive radar systems, signal returns from reflecting targets close to the aircraft provide a greater intensity in their appearance on the display than returns which are further away from the aircraft. Thus, in the vicinity of the vertex of the radar sweep that is presented to the pilot on the cockpit display there is a substantial brightening of the pixels on the face of the CRT. This effect is achieved in accordance with the present invention by the modification circuitry shown in FIG. 33.

When writing data into the display memory 50, the contents of the memory cell being addressed are initially read out and coupled to a register 601. The output of register 601 is coupled over link 602 via a multiplexer 604 to one input of an adder 612. The other input of adder 612 is coupled from a register 611. Link 517, which carries the new data to be stored in display memory 50, is coupled to register 611. Adder 612 sums the contents of the new data value with the current contents of that pixel location and supplies the sum as an output over link 616 to a multiplexer 621. If the resulting sum is less than the maximum intensity data code value to be coupled for display on the CRT, multiplexer 621 will supply that data value to an output register 622. Register 622 supplies the resulting data value for storage in the display memory 50. Thus, for points close to the vertex of the radar sweep pattern (or origin location of the aircraft) as presented on the CRT display and, consequently, in the vicinity of display memory address location (X0, Y0), then for successive beam traces, such as B(i), beam B'(i), etc., there is an accumulation of the pixel intensity value at those points through the action of adder 612. The effect of this addition is represented on the CRT display as a brightening of the image of the radar return in the vicinity of the aircraft.

In the event that the accumulated value reaches a maximum or preestablished saturation level corresponding to the highest prescribed intensity level of the pixels to be displayed, multiplexer 621 couples an "all-ones" code supplied on link 615 to output register 622 for application to the address corresponding to the pixel data of interest. Control of multiplexer 621 is effected via link 617 which supplies a carry bit from adder 612 to switch multiplexer 621 to input link 615 in the event that the sum of the contents of registers 601 and 611 exceeds the above-referenced maximum limit.

During the above operation, an additional control input, corresponding to the direction of the scan is required. More specifically, where a beam trace reaches the end of its scan, namely the counter-clockwise-most edge or the clockwise-most edge, and then begins a retrace in the opposite direction, the data values for the pixel points along the beams of interest currently stored in the display memory are no longer considered to be valid data. In this instance, the pixel data value supplied over link 517 is not added to the invalid data contents of the memory 50, but is, instead, simply summed with a blank data representative value or all zeros. This is achieved in the circuitry shown in FIG. 33 by the coupling of the second input 603 of multiplexer 604 to a no data (all zeros) input. For determining the direction of scan, one of the bits of the data value stored in register 601 corresponds to the direction of the scan (namely "0" for a clockwise scan direction and a "1" for a counter-clockwise scan direction). That bit is coupled to exclusive OR gate 605 via link 606. A scan sync signal from the master timing circuitry is coupled to flip-flop 613. The output of flip-flop 613 is coupled over link 614 to one input of exclusive OR gate 605 and to output register 622. As long as there is a match between the bit on link 606 and link 614, then the contents of the addressed memory location in the display memory are considered to be valid data, namely the pixel currently being addressed, which has been previously addressed, was addressed during the present sweep cycle, as opposed to a previous opposite scan sweep cycle. In this instance, multiplexer 604 couples the contents of register 601 via link 602 to adder 612. Once the addressing reaches the end of the sweep (the counter-clockwise-most edge or the clockwise-most edge) and begins to reverse, then the inputs to exclusive OR circuitry 605 will produce a mismatch, in which instance multiplexer 604 couples blank data (all zeros) on link 603 to adder 612, so that at the address memory location of interest in the display memory 50 the pixel data is derived exclusively from the input on link 517, rather than an accumulated value based upon the value stored in register 601 and its sum with the contents of register 611. In this manner, read-modify-write circuit 561 provides both an accurate simulation of a conventional analog return, and prevents erroneous data from being generated in a digital simulation scheme by the above-described accumulation process.

As will be appreciated from the foregoing description of the digital radar signal processing scheme according to the present invention, advantage is taken of the availability of compressed terrain map data that may be stored in the accessed from memory, such as the compressed data base employed in the system described in the above-referenced '742 application, to artificially generate a radar return image pattern on a cockpit display which effectively simulates that which would otherwise be provided by conventional T/R equipment. Since the compressed data base contains both elevation and cultural features of the terrain that would normally be intercepted by reflected back to the aircraft's radar beam, this data may be subjected to signal processing functions to establish pixel intensity control signals by way of which a radar image of a cockpit CRT display is generated. This signal processing and control system includes system functional components for establishing the simulation of the effect of a radar beam having a prescribed beam width, slant-angle, and field of scan, and for controllably accessing the stored terrain map data from memory so as to provide a pixel display data base in accordance with which the pixels of the cockpit radar display are intensity-modulated.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use with a terrain map storage device containing a digital data base in which a terrain map in the form of data representative of at least the elevation of said terrain over a prescribed geographical area is stored, an apparatus for generating a simulated radar return image to be produced on a video display device corresponding to a radar sweep pattern directed toward said terrain from a designated radar source reference point about a preselected look angle, comprising:

memory means for storing, in addressable memory locations thereof, a portion of the digital data representative of at least the elevation of terrain over a portion of said geographical area such that, as stored in said memory means, said terrain representative data has a prescribed geographical orientation;

first means, coupled to said memory means, for controllably accessing data values stored in addressable memory locations of said memory means for a plurality of successive locations on said terrain map along each of a plurality of rays of which said radar sweep pattern is formed and radiating from said designated radar source point about the look angle of said radar sweep pattern, said look angle having a geographical orientation which is independent of said prescribed geographical orientation, and generating therefrom first signals representative of the effective range from said designated radar source reference point to the plurality of successive locations on said terrain map for each of said rays, and second signals representative of the effective intensity of radar sweep pattern return signals reflected back from said successive locations to said radar source reference point; and second means, coupled to said first means, for controllably energizing the pixels of a video display device in accordance with said second signals, the locations of which on said display device being selected in accordance with said first signals.

2. An apparatus according to claim 1, wherein said data includes data representative of cultural features of said terrain.

3. An apparatus according to claim 1, wherein said apparatus is adapted to receive navigational information from a vehicle in which said apparatus is provided for designating the location of said vehicle relative to the terrain over which said vehicle is passing as said radar source reference point.

4. An apparatus according to claim 3, wherein said vehicle is an aircraft and said navigational information includes altimeter and aircraft heading information.

5. An apparatus according to claim 4, wherein said first means includes means for defining said radar sweep pattern in accordance with a prescribed slant angle relative to the flight of said aircraft.

6. An apparatus according to claim 1, wherein said first means includes means for generating, for each respective one of said successively accessed locations along said plurality of rays a first data value representative of the range from said radar source reference point to said respective one location and a second data value representative of the effective intensity of the radar return that would be produced by said terrain at said respective one location to said radar source reference point.

7. An apparatus according to claim 6, wherein said apparatus is adapted to receive navigational information from a vehicle in which said apparatus is provided for designating the location of said vehicle relative to the terrain over which said vehicle is passing as said radar source reference point.

8. An apparatus according to claim 7, wherein said first means includes means for controllably adjusting the accessing of data values along said plurality of rays in accordance with a change in direction of travel of said vehicle.

9. An apparatus according to claim 8, wherein said controllably adjusting means includes means for controlling the rate of the change in direction of successive ones of said rays along which data values are accessed in accordance with a change in direction of travel of said vehicle.

10. An apparatus according to claim 6, wherein said memory means includes means for storing, characteristics of said terrain for a matrix of geographical locations on said terrain, and wherein said first means includes means for interpolating respective ones of said second data values whose corresponding first data values are associated with locations on said terrain other than the geographical locations of said matrix.

11. An apparatus according to claim 10, wherein the number of successive locations along said plurality of rays and the resolution of said rays through which said memory means is addressed by said first means are selected to ensure that all of the geographical locations of said matrix that fall within the confines of said radar sweep pattern are accessed by said first means.

12. An apparatus according to claim 6, wherein said first means includes means for generating a respective second data value in accordance with characteristics of the radar beam the return for which is being simulated.

13. An apparatus according to claim 12, wherein the characteristics of the radar beam include the energy distribution profile of the beam in a vertical direction from said radar source reference point to said terrain.

14. An apparatus according to claim 6, wherein said first means includes means for generating a respective second data value in accordance with prescribed surface characteristics of the terrain.

15. An apparatus according to claim 6, wherein said second means includes means for storing successive ones of said second data values for each ray among said plurality of rays and selectively combining said stored data values to generate successive ones of third data values at successively addressed locations along a plurality of beam lines extending from said radar source reference point and effectively projected over said terrain map.

16. An apparatus according to claim 15, wherein said storing means comprises a plurality of registers, each of which has a capacity to store all of the second data values capable of being generated for any ray among said plurality of rays, and means for controllably coupling the contents of said registers in sequence through one another in accordance with the processing of successive ones of said rays.

17. An apparatus according to claim 16, wherein said selectively combining means includes means, selectively coupled to said registers, for controllably combining the values stored in respective storage locations of each of said registers to generate said successive ones of third data values.

18. An apparatus according to claim 17, wherein said second means further includes means for storing successive ones of said third data values for each beam line among said plurality of beam lines, and selectively combining stored data values for a respective beam in accordance with characteristics of the type radar beam whose return pattern said apparatus is intended to simulate.

19. An apparatus according to claim 18, wherein said second means includes means for selectively combining said stored data values in accordance with a prescribed beam energy distribution profile.

20. An apparatus according to claim 16, wherein said storing means includes means for clearing the contents of a first of said plurality of registers through which the second data values of a respective ray are sequentially coupled prior to storing successive ones of said second data values there.

21. An apparatus according to claim 20, wherein said storing means comprises a pair of input registers into the cleared contents of a selected one of which the respective data values of a respective ray are sequentially coupled while the previously stored contents of the other one of which corresponding to a preceding ray are sequentially read out into a sequential one of said plurality of registers for storage thereby.

22. An apparatus according to claim 15, wherein said video display device comprises a raster scan type display device, and wherein said second means includes pixel memory means for storing pixel energization data in memory locations thereof corresponding to the locations of the pixels of said display device, said pixel energization data being derived in accordance with said third data values.

23. An apparatus according to claim 22, wherein said second means includes means for generating, in accordance with said third data values and said first data values, pixel energization data associated with a plurality of beam scan lines through which each pixel, that is effectively delineated within the radar sweep pattern to be displayed, is selectively illuminated.

24. An apparatus according to claim 23, wherein said second means includes means for controllably causing pixel energization data, generated in accordance with said third data values and said first data values, to be stored in first selected field locations of said pixel memory means, while controllably causing previously stored pixel energization data, generated in accordance with said third data values and said first data values, to be read out of second selected field locations of said pixel memory means and coupled to said raster scan type display device for display.

25. An apparatus according to claim 1, wherein said video display device includes a matrix of pixels which are scanned in accordance with a first prescribed scanning pattern for effecting the selective energization thereof and wherein said second means includes pixel memory means for storing pixel energization data in memory locations thereof corresponding to the locations of the pixels of said display device, said pixel energization data being derived in accordance with said first and second data values.

26. An apparatus according to claim 25, wherein said second means includes means for controllably writing said pixel energization data into pixel memory locations in said memory means in accordance with said radar sweep pattern.

27. An apparatus according to claim 26, wherein said first prescribed scanning pattern is an effectively rectangular coordinate system-based scan of the pixels of said display device and said radar sweep pattern is an effectively polar coordinate system-based scan.

28. For use with a terrain map storage device containing a digital data base in which a terrain map in the form of data representative of at least the elevation of said terrain over a prescribed geographical area is stored, a method of generating a simulated radar return image to be produced on a video display device corresponding to a radar sweep pattern directed toward said terrain from a designated radar source reference point about a preselected look angle, comprising the steps of:
(a) storing, in addressable memory locations of a memory, a portion of the digital representative of at least the elevation of terrain over a portion of said geographical area such that, as stored in said memory, said terrain representative data has a prescribed geographical orientation;
(b) controllably accessing data values stored in addressable memory locations of said memory for a plurality of sucessive locations on said terrain map along each of a plurality of rays of which said radar sweep pattern is formed and radiating from said designated radar source point about the look angle of said radar sweep pattern, said look angle having a geographical orientation which is independent of said prescribed geographical orientation, and generating therefrom first signals representative of effective range from said designated radar source reference point to the plurality of successive locations on said terrain map for each of said rays, and second signals representative of the effective intensity of radar sweep pattern return signals reflected back from said successive locations to said radar source reference point; and
(c) controllably energizing the pixels of a video display device in accordane with said second signals, the locations of which on said display device being selected in accordance with said first signals.

29. A method according to claim 28, wherein said data includes data representative of cultural features of said terrain.

30. A method according to claim 28, wherein said radar source reference point is derived in accordance with navigational information from a vehicle for designating the location of said vehicle relative to the terrain over which said vehicle is passing.

31. A method according to claim 30, wherein said vehicle is an aircraft and said navigational information includes altimeter and aircraft heading information.

32. A method according to claim 31, wherein said radar sweep pattern is defined in accordance with a prescribed slant angle relative to the flight of said aircraft.

33. A method according to claim 28, wherein step (b) includes generating, for each respective one of said successively accessed locations along said plurality of rays, a first data value representative of the range from said radar source reference point to said location, and a second data value representative of the effective intensity of the radar return that would be produced by said terrain at said respective one location to said radar source reference point.

34. A method according to claim 33, wherein said memory contains data defining characteristics of said terrain for a matrix of geographical locations on said terrain, and wherein said step (b) includes interpolating respective ones of said second data values whose corresponding first data values are associated with locations on said terrain other than the geographical locations of said matrix.

35. A method according to claim 34, wherein the number of successive locations along said plurality of rays and the resolution of said rays through which said terrain map data base is addressed in step (b) are selected to ensure that all of the geographical locations of said matrix that lie within the confines of said radar sweep pattern are accessed.

36. A method according to claim 33, wherein step (b) includes generating a respective second data value in accordance with characteristics of the radar beam the return for which is being simulated.

37. A method according to claim 36, wherein the characteristics of the radar beam include the energy distribution profile of the beam in a vertical direction from said radar source reference point to said terrain.

38. A method according to claim 33, wherein step (b) includes generating a respective second data value in accordance with prescribed surface characteristics of the terrain.

39. A method according to claim 33, wherein step (c) includes storing successive ones of said second data values for each ray among said plurality of rays and selectively combining said stored data values to generate successive ones of third data values at successively addressed locations along a plurality of beam lines extending from said radar source reference point and effectively projected over said terrain map.

40. A method according to claim 39, wherein said step (c) includes selectively combining said stored data values in accordance with a prescribed beam energy distribution profile.

41. A method according to claim 39, wherein said video display device comprises a raster scan type display device and wherein step (c) includes storing pixel energization data in a pixel memory, storage locations of which correspond to the locations of the pixels of said display device, said pixel energization data being derived in accordance with said third data values.

42. A method according to claim 41, wherein step (c) includes generating, in accordance with said third data values and said first data values, pixel energization data associated with a plurality of beam scan lines through which each pixel, that is effectively delineated within the radar sweep pattern to be displayed, is selectively energized.

43. A method according to claim 42, wherein step (c) includes controllably causing pixel energization data, generated in accordance with said third data values and said first data values, to be stored in first selected field locations of said pixel memory, while controllably causing previously stored pixel energization data, generated in accordance with said third data values and said first data values, to be read out of second selected field locations of said pixel memory and to be coupled to said raster scan type display device for display.

44. A method according to claim 28, wherein said video display device includes a matrix of pixels which are scanned in accordance with a first prescribed scanning pattern for effecting the selective energization thereof, and wherein step (c) includes storing pixel energization data in memory locations of a pixel memory corresponding to the locations of the pixels of said display device, said pixel energization data being derived in accordance with said first and second data values.

45. A method according to claim 44, wherein step (c) includes controllably writing said pixel energization data into pixel memory locations in said memory in accordance with said radar sweep pattern.

46. A method according to claim 45, wherein said first prescribed scanning pattern is an effectively rectangular coordinate system-based scan of the pixels of said display device and said radar sweep pattern is an effectively polar coordinate system-based scan.

* * * * *